(12) United States Patent
Nakagawa et al.

(10) Patent No.: US 10,790,535 B2
(45) Date of Patent: Sep. 29, 2020

(54) ELECTRODE FOR SECONDARY CELL, AND SECONDARY CELL

(71) Applicant: Nissan Motor Co., Ltd., Yokohama-shi, Kanagawa (JP)

(72) Inventors: Takamasa Nakagawa, Kanagawa (JP); Hiroyuki Tanaka, Kanagawa (JP); Takahiro Tsukada, Kanagawa (JP); Hideaki Horie, Kanagawa (JP); Yuuki Kusachi, Kanagawa (JP); Yuusuke Emori, Kyoto (JP); Yuusuke Mizuno, Kyoto (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/468,794

(22) PCT Filed: Dec. 14, 2017

(86) PCT No.: PCT/JP2017/044941
§ 371 (c)(1),
(2) Date: Jun. 12, 2019

(87) PCT Pub. No.: WO2018/110655
PCT Pub. Date: Jun. 21, 2018

(65) Prior Publication Data
US 2020/0099087 A1 Mar. 26, 2020

(30) Foreign Application Priority Data
Dec. 15, 2016 (JP) .................................. 2016-243624

(51) Int. Cl.
*H01M 10/04* (2006.01)
*H01M 10/62* (2014.01)
(Continued)

(52) U.S. Cl.
CPC ............. *H01M 10/04* (2013.01); *H01M 4/13* (2013.01); *H01M 4/62* (2013.01); *H01M 10/52* (2013.01);
(Continued)

(58) Field of Classification Search
None
See application file for complete search history.

(56) References Cited

U.S. PATENT DOCUMENTS 6,087,043 A * 7/2000 Tossici ................. H01M 4/133
429/231.4
2011/0281142 A1 11/2011 He et al.
(Continued)

FOREIGN PATENT DOCUMENTS

CN 101847748 A 9/2010
EP 2056375 A1 5/2009
(Continued)

*Primary Examiner* — Daniel S Gatewood
(74) *Attorney, Agent, or Firm* — Young Basile Hanlon & MacFarlane, P.C.

(57) ABSTRACT

An electrode for a secondary cell includes a current collector and an electrode layer. The electrode layer has a gas flow passage disposed on the surface and/or in the interior of the electrode layer. The gas flow passage extends in the in-plane direction of the electrode layer. The electrode layer is made from an electrode layer forming material that contains an electrode active material and an ion conductive liquid and is a non-bonded body. A secondary cell comprises a power generation element having an electrolyte layer, a positive electrode disposed on a first surface side of the electrolyte layer, and a negative electrode disposed on a second surface side on the back of the first surface side of the electrolyte layer; and an outer casing that houses the power generation element. At least one of the positive electrode and the negative electrode is the electrode for a secondary cell.

13 Claims, 13 Drawing Sheets

(51) Int. Cl.
*H01M 4/13* (2010.01)
*H01M 4/62* (2006.01)
*H01M 10/52* (2006.01)
*H01M 10/052* (2010.01)
*H01M 10/0585* (2010.01)

(52) U.S. Cl.
CPC .......... *H01M 10/62* (2015.04); *H01M 10/052* (2013.01); *H01M 10/0585* (2013.01)

(56) References Cited

U.S. PATENT DOCUMENTS

| | | |
|---|---|---|
| 2017/0012283 A1 | 1/2017 | Mizuno et al. |
| 2017/0033350 A1 | 2/2017 | Mizuno et al. |
| 2018/0301691 A1 | 10/2018 | Mizuno et al. |

FOREIGN PATENT DOCUMENTS

| | | | |
|---|---|---|---|
| JP | 2001023612 A | | 1/2001 |
| JP | 2001176558 A | | 6/2001 |
| JP | 2004207253 A | | 7/2004 |
| JP | 2008226807 A | | 9/2008 |
| JP | 2016152125 A | | 8/2016 |
| JP | 2017004946 A | | 1/2017 |
| JP | 2017045530 A | | 3/2017 |
| KR | 20130023035 A | | 3/2013 |
| KR | 20160087115 A | * | 7/2016 |
| KR | 20160087115 A | | 7/2016 |
| WO | 9700539 A1 | | 1/1997 |
| WO | 2015093411 A1 | | 6/2015 |
| WO | 2015137041 A1 | | 9/2015 |

\* cited by examiner

ELECTRODE FOR SECONDARY CELL, AND SECONDARY CELL

CROSS REFERENCE TO RELATED APPLICATION

The present application is based on Japanese Patent Application No. 2016-243624 filed on Dec. 15, 2016, the entire content of which is herein incorporated by reference.

TECHNICAL FIELD

The present invention relates to an electrode for a secondary cell, and to a secondary cell.

BACKGROUND

In recent years, in order to address air pollution and global warming, it has been eagerly desired to reduce the amounts of carbon dioxide emitted. In the automotive field, the anticipation is that, by introducing electric vehicles and hybrid electric vehicles and so on, it will be possible to reduce the amounts of carbon dioxide emitted. And the development of cells for driving electric motors is a key to practical implementation of such vehicles, and is being energetically performed.

Attention is being directed to a lithium ion secondary cell as a cell for driving an electric motor, since it has high theoretical energy, and currently development for implementing a cell with higher performance is progressing rapidly. Generally, a lithium ion secondary cell includes a positive electrode, a negative electrode and an electrolyte disposed between these, all housed in a cell casing. The positive electrode is formed by applying a positive electrode slurry including a positive electrode active material upon the surface of a current collector and drying it, and the negative electrode is formed by applying a negative electrode slurry including a negative electrode active material upon the surface of a current collector and drying it.

In the prior art, a long-lived non-aqueous electrolytic secondary cell has been proposed in which decrease of the capacity and the cell voltage resulting from non-uniform distribution of the non-aqueous electrolyte caused by repeated charge/discharge cycles is low. This non-aqueous electrolytic secondary cell includes an electrode group in which a positive electrode in which a belt-shaped positive electrode active material layer is formed upon the surface of a current collector, a belt-shaped negative electrode in which a negative electrode active material layer is formed upon the surface of a current collector, and a separator interposed between said positive electrode and said negative electrode are laminated together and wound in a spiral, and are housed in a container together with a non-aqueous electrolytic solution. And at least one of the positive electrode and the negative electrode has a groove in the abovementioned active material layer, and at least one end of said groove terminates upon the long side of the abovementioned active material layer (Please refer to Japanese Laid-Open Patent Publication 2001-176558).

SUMMARY

Meanwhile, the present inventors have investigated ways to enhance the discharge capacity of a secondary cell and to improve the productivity of a method for manufacturing the secondary cell, and have conceived the technical insight that, during manufacture of an electrode, it is possible to omit a process of drying electrode slurry that has been applied.

And further investigations based upon this technical knowledge have revealed that the electrode of this type has the following new problem that must be solved.

As compared with a case in which a secondary cell is manufactured by forming an electrode structure by laminating together electrodes that have been made by drying, and then permeating this structure with a non-aqueous electrolytic solution, when a secondary cell is manufactured by laminating together electrodes that have been formed without being dried, then entrapment of air in the electrode layer can easily occur. Moreover, as compared with a secondary cell that is manufactured by laminating together electrodes that have been made by drying to constitute an electrode structure and then permeating this electrode structure with a non-aqueous electrolytic solution, with a secondary cell that has been manufactured by laminating together electrodes that have been made without being dried, for example, gas which can be generated in the secondary cell due to a side reaction occurring during charging and discharging tends not to be discharged from the electrode layers. These factors may cause deterioration of the performance of the secondary cell.

The present invention has been conceived in consideration of the requirement for solution of this new type of problem. And the object of the present invention is to provide an electrode for a secondary cell, and a secondary cell, with which excellent discharge capacity and charge/discharge efficiency can be achieved, by obtaining an electrode for a secondary cell, with which entrapment of air in the electrode layers cannot easily occur, even when the secondary cell is manufactured by laminating together electrodes that have been made without being dried, and gas which can be generated in the secondary cell due to a side reaction is readily discharged from the electrode layers.

The present inventors have conducted diligent investigations in order to achieve the objective described above. And, as a result, they have found that it is possible to achieve the objective described above by providing, upon the surface of a current collector, an electrode layer that is made from an electrode layer forming material containing an electrode active material and an ion conductive liquid, that has a predetermined gas flow passage, and that is a non-bonded body, and thus the present invention has been completed.

According to the present invention, it is possible to provide an electrode for a secondary cell, and a secondary cell, that can realize excellent discharge capacity and charge/discharge efficiency.

DETAILED DESCRIPTION

Figure 1:
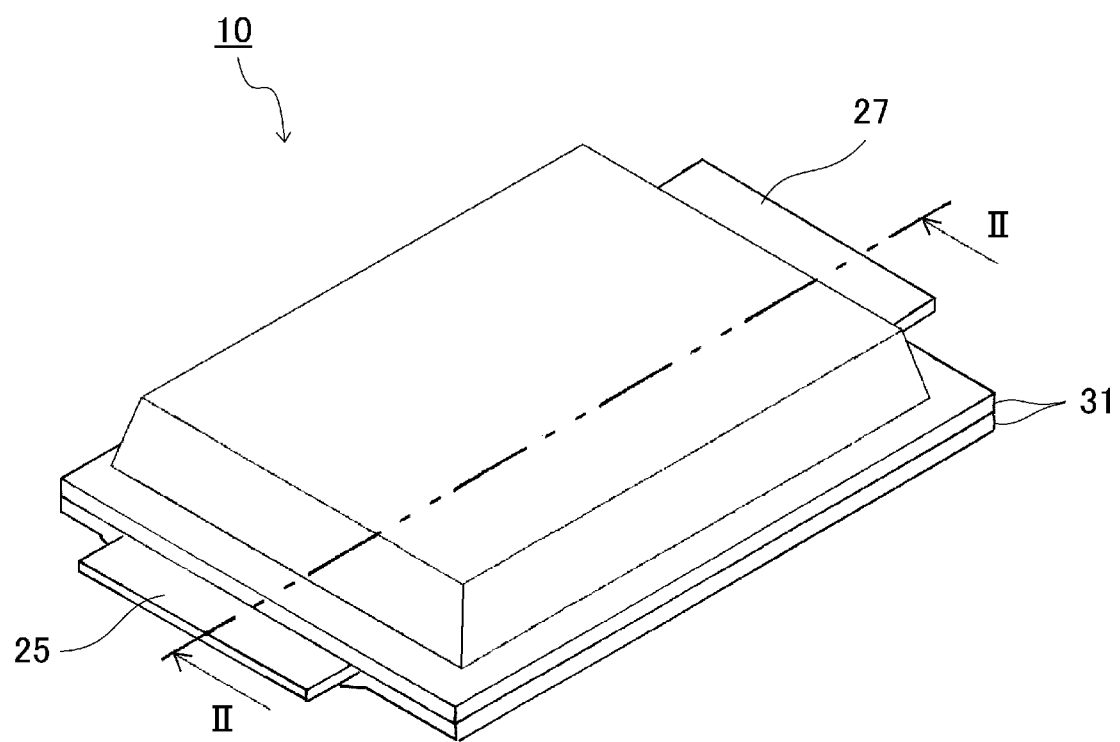
FIG. 1 is a schematic perspective view showing the external appearance of a secondary cell according to an embodiment of the present invention.

An electrode for a secondary cell, and a secondary cell, according to embodiments of the present invention will now be explained in detail.

First, an electrode for a secondary cell according to an embodiment of the present invention will be described in detail. The electrode for a secondary cell according to this embodiment comprises a current collector and an electrode layer disposed upon the surface of the current collector. And the electrode layer has a predetermined gas flow passage disposed on the surface and/or in the interior of the electrode layer. Moreover, the electrode layer is made from an electrode layer forming material that contains an electrode active material and an ion conductive liquid. And the electrode layer is a non-bonded body.

Even in the case of electrodes for a secondary cell that have been formed without being dried, when a secondary cell has been formed by laminating together electrodes for a secondary cell of this type, air cannot easily be entrapped in the electrode layer because gas can easily be discharged, and moreover gas (hereinafter also referred to as "side reaction gas") which may be generated in the interior of the secondary cell due to side reaction can also easily be discharged from the electrode layer. As a result, it is possible to provide an electrode for a secondary cell that can realize excellent discharge capacity and charge/discharge efficiency.

Here, in the present invention, "a predetermined gas flow passage" means a gas flow passage that extends in the in-plane direction of the electrode layer. Although this is not particularly limitative, it is preferable for such a predetermined gas flow passage to be, for example, a gas flow passage that has one or both of a straight portion and a curved portion. Furthermore, although this is not particularly limitative, it is preferable for the predetermined gas flow passage to be, for example, a gas flow passage that has one or both of a straight portion and a curved portion that are arranged in a regular manner. Yet further, as a representative, it may be suggested that the predetermined gas flow passage may, for example, be a gas flow passage having a straight groove shape or tubular shape; but the predetermined gas flow passage is not limited thereto. However, open holes that have been formed randomly in the electrode layer by removing solvent during the step of drying the electrode layer or the like are not to be considered as being included in the concept of "a predetermined gas flow passage".

Furthermore, in the present invention, "non-bonded body" means that the electrode active material are not bonded to each other with any binder. In other words the particles in the electrode layers, i.e. the positive electrode active material particles included in the positive electrode layer and the negative electrode active material particles included in the negative electrode layer, are all in a movable state in response to external force, so that the positive electrode layer and the negative electrode layer, which are both non-bonded bodies, can be freely deformed in response to external force. Since the positive electrode active material particles included in the positive electrode layer and the negative electrode active material particles included in the negative electrode layer are capable of moving to adapt to deformation of the positive electrode layer and/or the negative electrode layer, accordingly the electrical connection between adjacent positive electrode active material particles and between adjacent negative electrode active material particles are not interrupted. Due to this, it is still possible for a conductive path to be maintained even if the secondary cell is greatly deformed, so that excellent charge/discharge characteristics can be performed.

Yet further, it is preferable for the positive electrode layer and the negative electrode layer, both of which are non-bonded bodies, to be in a state that has fluidity. Powder-like state, slurry-like state, suspension-like state and so on may be cited as examples of the state that has fluidity; and, when the positive electrode active material particles or the negative electrode active material particles are mixed together with an electrolytic solution, which is an example of an ion conductive liquid, it is also possible to realize the state close to gel-like state or powder-like state or the like by adjusting the mixing mass ratio thereof.

And, in the electrode for a secondary cell according to this embodiment, it is preferred for the viscosity of the electrode layer forming material to be 2.8 Pa·s or more and 7.7 Pa·s or less.

Specifically, when the viscosity of the electrode layer forming material is less than 2.8 Pa·s, it is difficult to maintain the desired shape for the electrode layer. Moreover, when the viscosity of the electrode layer forming material is more than 7.7 Pa·s, it is difficult to form the desired shape for the electrode layer. On the other hand, in case a secondary cell is manufactured by laminating together secondary cell electrodes formed without being dried, entrapment of air in the electrode layers is unlikely to occur, and moreover side reaction gas can also be easily discharged from the electrode layer, by setting the viscosity of the electrode layer forming material to be 2.8 Pa·s or more and 7.7 Pa·s or less. As a result, it is possible to provide an electrode for a secondary cell that is capable of realizing excellent discharge capacity and charge/discharge efficiency. Furthermore, it is preferable for the viscosity of the electrode layer forming material to be 3.2 Pa·s or more, since this makes the stability of the electrode shape even more excellent. Moreover, it is preferable for the viscosity of the electrode layer forming material to be 7.1 Pa·s or lower, because this ensures that the ion conductivity is more excellent.

Here, in this specification, "viscosity of electrode layer forming material" means the viscosity of electrode layer forming material at 25° C. and 46.4 s-1, and this can be measured by employing a rotary viscometer. More specifically, for performing this measurement, a MCR502 rheometer made by Anton Paar Co. Ltd. is employed, and a test specimen of suitable amount is obtained from a container with a spatula or the like and is placed upon the device stage. The test specimen on the stage is sandwiched between disk shaped plates, the excess protruding from the disk shaped plates is removed with a squeegee or the like, and, after the temperature reaches 25° C., measurement is started from a shear speed of 0.1 s-1.

Furthermore, in the electrode for a secondary cell according to the present embodiment, it is preferable for the gas flow passage to have a groove shape or a tubular shape, and in particular it is preferable for it to have a straight groove shape or a straight tubular shape.

In other words, by providing at least one of a gas flow passage having a groove shape and a gas flow passage having a tubular shape, and, preferably, at least one of a gas flow passage having a straight groove shape and a gas flow passage having a straight tubular shape, even when a secondary cell is manufactured by laminating together secondary cell electrodes that are formed without being dried, it becomes more difficult for air to be entrapped in an electrode layer, and moreover it becomes easy for side reaction gas to be discharged from the electrode layer. As a result, it is possible to provide an electrode for a secondary cell that is capable of realizing more excellent discharge capacity and charge/discharge efficiency.

Yet further, in the electrode for a secondary cell according to the present embodiment, it is preferable for the ratio of the size of the gas flow passage in the in-plane direction of the electrode layer (which is not the length of the gas flow passage, but corresponds to the so-called horizontal width of the gas flow passage) with respect to the thickness of the electrode layer, to be 0.32 or less. Even in the case of electrodes for a secondary cell that have been formed without being dried, when a secondary cell has been manufactured by laminating together secondary cell electrodes of this type, it becomes more difficult for air to be entrapped in the electrode layer since gas can be easily discharged therefrom, and moreover it becomes easy for side reaction gas to be discharged from the electrode layer. Furthermore, it is possible to ensure the thickness of the electrode layer while forming such a predetermined gas flow passage. As a result, it is possible to provide an electrode for a secondary cell that is capable of realizing more excellent discharge capacity and charge/discharge efficiency.

In other words, by setting the ratio of the size of the gas flow passage in the in-plane direction of the electrode layer with respect to the thickness of the electrode layer to be 0.32 or less, it is possible to ensure the thickness of the electrode layer while forming the predetermined gas flow passage, and this is preferable in order to be able to improve the discharge capacity. Moreover, it is preferable to set the ratio of the size of the gas flow passage in the in-plane direction of the electrode layer with respect to the thickness of the electrode layer to be 0.004 or more, since then it is easy to discharge generated gas, and it is more preferred for this ratio to be 0.009 or more, and yet more preferred for it to be 0.03 or more.

It should be understood that, in the present invention, the values of "the thickness of the electrode layer", of "the size of the gas flow passage", and of "an interval of a gas flow passage" which will be described hereinafter may be measured, for example, after having frozen the electrode layer as required, by observing a cross section of the electrode layer with a scanning electron microscope, or by employing X-ray CT.

Furthermore, in the electrode for a secondary cell according to this embodiment, it is preferred for the gas flow passage to communicate with the outer peripheral edge of the electrode layer. Even in the case of electrodes for a secondary cell that have been formed without being dried, when a secondary cell has been manufactured by laminating together secondary cell electrodes of this type, it becomes more difficult for air to be entrapped in the electrode layer since gas can be easily discharged therefrom, and moreover it becomes easy for side reaction gas to be discharged from the electrode layer. As a result, it is possible to provide an electrode for a secondary cell that is capable of realizing more excellent discharge capacity and charge/discharge efficiency.

Yet further, in the electrode for a secondary cell according to this embodiment, it is preferred for one or both of the size of the gas flow passage in the direction of the thickness of the electrode layer (it should be understood that this is not the length of the gas flow passage, but corresponds to the so-called vertical width of the gas flow passage) and the size of the gas flow passage in the in-plane direction of the electrode layer (it should be understood that this is not the length of the gas flow passage, but corresponds to the so-called horizontal width of the gas flow passage) to be 2 µm or more. Even in the case of electrodes for a secondary cell that have been formed without being dried, when a secondary cell has been manufactured by laminating together secondary cell electrodes of this type, it becomes more difficult for air to be entrapped in the electrode layer since gas can be easily discharged therefrom, and moreover it becomes easy for side reaction gas to be discharged from the electrode layers. As a result, it is possible to provide an electrode for a secondary cell that is capable of realizing more excellent discharge capacity and charge/discharge efficiency.

In other words, it is preferable to set one or both of the size of the gas flow passage in the direction of the thickness of the electrode layer and the size of the gas flow passage in the in-plane direction of the electrode layer to 2 µm or more, since this makes it easy for air or side reaction gas to be discharged from the electrode layer, and it is more preferable to set one or both of these sizes to 3 µm or more. Moreover, although this is not particularly limitative, from the standpoint of ensuring more excellent discharge capacity and charge/discharge efficiency, it is more preferable for the size of the gas flow passage in the direction of the thickness of the electrode layer to be 100 µm or more, while it is preferable for this size to be 700 µm or less, more preferable for it to be 650 µm or less, and yet more preferable for it to be 370 µm or less. Furthermore, although this is not particularly limitative, from the standpoint of ensuring more excellent discharge capacity and charge/discharge efficiency, it is more preferable for the size of the gas flow passage in the in-plane direction of the electrode layer to be 40 µm or more, while it is preferable for it to be 200 µm or less, and more preferable for it to be 80 µm or less.

Still further, in the electrode for a secondary cell according to this embodiment, it is preferred for the electrode layer to have gas flow passages, and for the interval between adjacent gas flow passages to be 30 mm or less. Even in the case of electrodes for a secondary cell that have been formed without being dried, when a secondary cell has been manufactured by laminating together secondary cell electrodes of this type, it becomes more difficult for air to be entrapped in the electrode layer since gas can be easily discharged therefrom, and moreover it becomes easy for side reaction gas to be discharged from the electrode layer. As a result, it is possible to provide an electrode for a secondary cell that is capable of realizing more excellent discharge capacity and charge/discharge efficiency.

In other words, it is preferable to set the interval between adjacent gas flow passages to 30 mm or less, because this makes it easy for air and side reaction gas to be discharged from the electrode layer, and it is more preferred for the interval to be set to 15 mm or less. Furthermore, although this is not particularly limitative, from the standpoint of ensuring a more excellent discharge capacity and charge/discharge efficiency, it is preferred for the interval between adjacent gas flow passages to be 1 mm or more, more preferably 5 mm or more, and even more preferably 10 mm or more.

Even further, the electrode for a secondary cell according to this embodiment is preferably a bipolar type electrode. With this type of electrode for a secondary cell, it is more difficult for air or side reaction gas to be discharged from the electrode layer, as compared to the case of a non-bipolar type electrode. Accordingly it is more difficult for air to be entrapped in the electrode layer, and moreover the advantageous effect of improvement of the discharge capacity and charge/discharge efficiency, which is due to side reaction gas being readily discharged from the electrode layer, appears more prominently. As a result, it is possible to provide an electrode for a secondary cell that can realize particularly excellent discharge capacity and charge/discharge efficiency.

Moreover, in the electrode for a secondary cell according to this embodiment, it is preferred for the current collector to be a resin current collector. With this type of electrode for a secondary cell, it is more difficult for air or side reaction gas to be discharged from the electrode layer, as compared to the case in which the current collector is not a resin current collector. Accordingly it is more difficult for air to be entrapped in the electrode layer, and moreover the advantageous effect of improvement of the discharge capacity and charge/discharge efficiency, which is due to side reaction gas being readily discharged from the electrode layer, appears more prominently. As a result, it is possible to provide an electrode for a secondary cell that can realize particularly excellent discharge capacity and charge/discharge efficiency.

Furthermore, in the electrode for a secondary cell according to this embodiment, it is preferred for the electrode layer forming material to contain resin, and for the amount of resin included in the electrode layer forming material to be 1% by mass or less. With an electrode for a secondary cell of this type, as compared to a case in which the amount of resin included in the electrode layer forming material is more than 1% by mass, it is more difficult for air or side reaction gas to be discharged from the electrode layer. Accordingly it is more difficult for air to be entrapped in the electrode layer, and moreover the advantageous effect of improvement of the discharge capacity and charge/discharge efficiency, which is due to side reaction gas being readily discharged from the electrode layer, appears more prominently. As a result, it is possible to provide an electrode for a secondary cell that can realize particularly excellent discharge capacity and charge/discharge efficiency.

Next, a secondary cell according to an embodiment of the present invention will be explained in detail. The secondary cell according to this embodiment comprises a power generation element comprising an electrolyte layer, a positive electrode for a secondary cell disposed on a first surface side of the electrolyte layer, and a negative electrode for a secondary cell disposed on a second surface side on the back of the first surface side of the electrolyte layer, and an outer casing that houses this power generation element. And at least one of the positive electrode for a secondary cell and the negative electrode for a secondary cell comprises a current collector and an electrode layer that is disposed upon the surface of that current collector. Moreover, the electrode layer has the above-described geometrical and artificial gas flow passage. Furthermore, the electrode layer is made from an electrode layer forming material that contains an electrode active material and an ion conductive liquid. Further, the electrode layer is a non-bonded body.

Even in the case of an electrode for a secondary cell that has been formed without being dried, when a secondary cell is manufactured by laminating together secondary cell electrodes of this type, it becomes more difficult for air to be entrapped in the electrode layer since gas can be easily discharged therefrom, and moreover it becomes easy for side reaction gas to be discharged from the electrode layer. As a result, it is possible to provide a secondary cell that is capable of realizing excellent discharge capacity and charge/discharge efficiency.

And, in the secondary cell of this embodiment, it is preferable for the viscosity of the electrode layer forming material to be 2.8 Pa·s or more and 7.7 Pa·s or less.

Specifically, when the viscosity of the electrode layer forming material is less than 2.8 Pa·s, it is difficult to maintain the desired shape for the electrode layer. Moreover, when the viscosity of the electrode layer forming material is more than 7.7 Pa·s, it is difficult to form the desired shape for the electrode layer. On the other hand, when a secondary cell is manufactured by laminating together secondary cell electrodes that have been formed without being dried, by setting the viscosity of the electrode layer forming material to be 2.8 Pa·s or more and 7.7 Pa·s or less, entrapment of air in the electrode layers is unlikely to occur, and moreover side reaction gas can also be easily discharged from the electrode layer. As a result, it is possible to provide a secondary cell that is capable of realizing excellent discharge capacity and charge/discharge efficiency. Furthermore, it is preferable for the viscosity of the electrode layer forming material to be 3.2 Pa·s or more, since this makes the stability of the electrode shape even more excellent. Moreover, it is preferable for the viscosity of the electrode layer forming material to be 7.1 Pa·s or lower, because this makes the ion conductivity more excellent.

Yet further, in the secondary cell according to the present embodiment, it is preferable for a gas flow passage to have a groove shape or a tubular shape, and in particular it is preferable for it to have a straight groove shape or tubular shape.

In other words, by providing at least one of a gas flow passage having a groove shape and a gas flow passage having a tubular shape, and, preferably, at least one of a gas flow passage having a straight groove shape and a gas flow passage having a straight tubular shape, even when a secondary cell is manufactured by laminating together secondary cell electrodes that are formed without being dried, it becomes difficult for air to be entrapped in the electrode layer, and moreover it becomes easy for side reaction gas to be discharged from the electrode layer. As a result, it is possible to provide a secondary cell that is capable of realizing excellent discharge capacity and charge/discharge efficiency.

Yet further, in the secondary cell according to the present embodiment, it is preferable for the ratio of the size of the gas flow passage in the in-plane direction of the electrode layer (which is not the length of the gas flow passage, but corresponds to the so-called horizontal width of the gas flow passage) with respect to the thickness of the electrode layer to be 0.32 or less. Even in the case of electrodes for a secondary cell that have been formed without being dried, when a secondary cell has been manufactured by laminating together secondary cell electrodes of this type, it becomes difficult for air to be entrapped in the electrode layer since gas can be easily discharged therefrom, and moreover it becomes easy for side reaction gas to be discharged from the electrode layer. Furthermore, it is possible to ensure the thickness of the electrode layer while forming such a predetermined gas discharging passage. As a result, it is possible to provide a secondary cell that is capable of realizing more excellent discharge capacity and charge/discharge efficiency.

In other words, by setting the ratio of the size of the gas flow passage in the in-plane direction of the electrode layer with respect to the thickness of the electrode layer to be 0.32 or less, it is possible to ensure the thickness of the electrode layer while still forming the predetermined gas flow passage, and this is preferable in order to be able to improve the discharge capacity. Moreover, it is preferable to set the ratio of the size of the gas flow passage in the in-plane direction of the electrode layer with respect to the thickness of the electrode layer to be 0.004 or more, since then it is easy to discharge generated gas, and it is more preferred for this ratio to be 0.009 or more, and even more preferred for it to be 0.03 or more.

Furthermore, in the secondary cell according to this embodiment, it is preferred for the gas flow passage to communicate with the outer peripheral edge of the electrode layer. Even in the case of electrodes for a secondary cell that have been formed without being dried, when a secondary cell has been manufactured by laminating together secondary cell electrodes of this type, it becomes more difficult for air to be entrapped in the electrode layer since gas can be easily discharged therefrom, and moreover it becomes easier for side reaction gas to be discharged from the electrode layer. As a result, it is possible to provide a secondary cell that is capable of realizing more excellent discharge capacity and charge/discharge efficiency.

Furthermore, in the secondary cell of the present embodiment, it is preferable for a surface pressure that is applied in the thickness direction of the electrode layers to be 68.6 kPa or more. Even in the case of electrodes for a secondary cell that have been formed without being dried, when a secondary cell has been manufactured by laminating together secondary cell electrodes of this type, it becomes more difficult for air to be entrapped in the electrode layer since gas can be easily discharged therefrom, and moreover it becomes easy for side reaction gas to be discharged from the electrode layers. As a result, it is possible to provide a secondary cell that is capable of realizing more excellent discharge capacity and charge/discharge efficiency.

It should be understood that the surface pressure described above may, for example, be applied by vacuum sealing that is performed when housing the power generation element in the outer casing which is made from laminated film. Moreover, provided that the desired shape of the electrode layer is preserved, from the standpoint of discharging of gas generated during the reaction, it is preferable for the surface pressure applied in the thickness direction of the electrode layer to be high. Although this is not particularly limitative, from the standpoint of making it easy to preserve the desired shape for the electrode layer, it is preferable for this pressure to be 600 kPa or less.

Yet further, in the secondary cell according to the present embodiment, it is preferred for one or both of the size of the gas flow passage in the direction of the thickness of the electrode layer (it should be understood that this is not the length of the gas flow passage, but corresponds to the so-called vertical width of the gas flow passage) and the size of the gas flow passage in the in-plane direction of the electrode layer (it should be understood that this is not the length of the gas flow passage, but corresponds to the so-called horizontal width of the gas flow passage) to be 2 μm or more. Even in the case of electrodes for a secondary cell that have been formed without being dried, when a secondary cell has been manufactured by laminating together secondary cell electrodes of this type, it becomes more difficult for air to be entrapped in the electrode layer since gas can be easily discharged therefrom, and moreover it becomes easy for side reaction gas to be discharged from the electrode layer. As a result, it is possible to provide an electrode for a secondary cell that is capable of realizing more excellent discharge capacity and charge/discharge efficiency.

In other words, it is preferable to set one or both of the size of the gas flow passage in the direction of the thickness of the electrode layer and the size of the gas flow passage in the in-plane direction of the electrode layer to 2 μm or more, since this makes it easy for air or side reaction gas to be discharged from the electrode layer, and it is more preferable to set one or both of these sizes to 3 μm or more. Moreover, although this is not particularly limitative, from the standpoint of ensuring more excellent discharge capacity and charge/discharge efficiency, it is more preferable for the size of the gas flow passage in the direction of the thickness of the electrode layer to be 100 μm or more, while it is preferable for this size to be 700 μm or less, and it is more preferable for it to be 650 μm or less, and it is yet more preferable for it to be 370 μm or less. Furthermore, although this is not particularly limitative, from the standpoint of ensuring more excellent discharge capacity and charge/discharge efficiency, it is more preferable for the size of the gas flow passage in the in-plane direction of the electrode layer to be 40 μm or more, while it is preferable for it to be 200 μm or less, and it is more preferable for it to be 80 μm or less.

Still further, in the secondary cell according to the present embodiment, it is preferred for the electrode layer to have gas flow passages, and for the interval between adjacent gas flow passages to be 30 mm or less. Even in the case of electrodes for a secondary cell that have been formed without being dried, when a secondary cell has been manufactured by laminating together secondary cell electrodes of this type, it becomes more difficult for air to be entrapped in the electrode layer since gas can be easily discharged therefrom, and moreover it becomes easy for side reaction gas to be discharged from the electrode layer. As a result, it is possible to provide a secondary cell that is capable of realizing more excellent discharge capacity and charge/discharge efficiency.

In other words, it is preferable to set the interval between adjacent gas flow passages to 30 mm or less because this makes it easy for air and side reaction gas to be discharged from the electrode layer, and it is more preferred for the interval to be set to 15 mm or less. Furthermore, although this is not particularly limitative, from the standpoint of ensuring a more excellent discharge capacity and charge/discharge efficiency, it is preferred for the interval between adjacent gas flow passages to be 1 mm or more, it is more preferred for it to be 5 mm or more, and it is even more preferred for it to be 10 mm or more.

Yet further, in the secondary cell of the present embodiment, at least the positive electrode for a secondary cell is a predetermined electrode for a secondary cell as described above, and it is preferred for the thickness of the positive electrode layer to be 140 μm or more, and for the ratio of the charging capacity of the negative electrode layer to the charging capacity of the positive electrode layer to be 1.05 or more. And, although this is not particularly limitative, it is preferable for mass per unit area of the positive electrode to be 30 mg/cm2 or more. With this type of secondary cell, the amount of side reaction gas generated per unit area is great. Accordingly, it is difficult for entrapment of air in the electrode layer to occur, and moreover the beneficial effect of improvement of the discharge capacity and charge/discharge efficiency due to the side reaction gas being easily discharged from the electrode layer appears more prominently. As a result, it is possible to provide a secondary cell that is capable of realizing particularly excellent discharge capacity and charge/discharge efficiency.

In other words, it is preferable to make the thickness of the positive electrode layer be 140 μm or more since the beneficial effect of discharge of the side reaction gas becomes more conspicuous, and it is more preferable to make this thickness be 250 μm or more, and even more preferable to make it be 300 μm or more. Furthermore, it is preferable to make the ratio of the charging capacity of the negative electrode layer to the charging capacity of the positive electrode layer be 1.05 or more, since this means that there is an extra charge acceptance capability upon the negative electrode side, and it is more preferable to make this ratio be 1.08 or more. Moreover, it is preferable to make the ratio of the charging capacity of the negative electrode layer to the charging capacity of the positive electrode layer be 1.3 or less, since this means that excessive negative electrode can be removed or reduced, and it is more preferable to make this ratio be 1.2 or less.

Even further, in the secondary cell of the present embodiment, both the positive electrode for a secondary cell and the negative electrode for a secondary cell are the predetermined electrodes for a secondary cell as described above, and it is preferred for an arrangement of a gas flow passage of the positive electrode layer in the in-plane direction of the positive electrode layer and an arrangement of a gas flow passage of the negative electrode layer in the in-plane direction of the negative electrode layer to be superimposed over one another. Even in the case of electrodes for a secondary cell that have been formed without being dried, when a secondary cell has been manufactured by laminating together secondary cell electrodes of this type, it becomes more difficult for air to be entrapped in the electrode layer since gas can be easily discharged therefrom, and moreover it becomes easy for side reaction gas to be discharged from the electrode layer. Moreover, it is possible to suppress local variations of the ratio of the charging capacity of the negative electrode layer with respect to the charging capacity of the positive electrode layer. As a result, it is possible to provide a secondary cell that is capable of realizing more excellent discharge capacity and charge/discharge efficiency. Furthermore, there is also the beneficial effect that it is possible to enhance the long-term reliability of the secondary cell.

Yet further, the secondary cell according to this embodiment is preferably a bipolar type secondary cell. With this type of an electrode for a secondary cell, it is relatively more difficult for air or side reaction gas to be discharged, as compared to the case of a non-bipolar type secondary cell. Accordingly it is more difficult for air to be entrapped in the electrode layer, and moreover the advantageous effect of improvement of the discharge capacity and charge/discharge efficiency, which is due to side reaction gas being readily discharged from the electrode layer, appears more prominently. As a result, it is possible to provide a secondary cell that can realize particularly excellent discharge capacity and charge/discharge efficiency.

Moreover, in the secondary cell according to this embodiment, it is preferred for the current collector to be a resin current collector. With this type of secondary cell, it is relatively more difficult for air or side reaction gas to be discharged from the electrode layer, as compared to the case in which the current collector is not a resin current collector. Accordingly it is more difficult for air to be entrapped in the electrode layer, and moreover the advantageous effect of improvement of the discharge capacity and charge/discharge efficiency, which is due to side reaction gas being readily discharged from the electrode layer, appears more prominently. As a result, it is possible to provide a secondary cell that can realize particularly excellent discharge capacity and charge/discharge efficiency.

Furthermore, in the secondary cell according to this embodiment, it is preferred for the electrode layer forming material to contain resin, and for the amount of resin included in the electrode layer forming material to be 1% by mass or less. With an electrode for a secondary cell of this type, as compared to a case in which the amount of resin included in the electrode layer forming material is more than 1% by mass, it is relatively more difficult for air or side reaction gas to be discharged from the electrode layer. Accordingly it is more difficult for air to be entrapped in the electrode layer, and moreover the advantageous effect of improvement of the discharge capacity and charge/discharge efficiency, which is due to side reaction gas being readily discharged from the electrode layer, appears more prominently. As a result, it is possible to provide a secondary cell that can realize particularly excellent discharge capacity and charge/discharge efficiency.

In the following, an electrode for a secondary cell and a secondary cell according to an embodiment of the present invention will be explained in detail by citing an example of a bipolar type lithium ion secondary cell, and with reference to the drawings. It should be understood that the ratios of the dimensions in the drawings referred to below are exaggerated for the convenience of explanation, and in some cases are different from the actual ratios. Moreover, to structural elements that are the same in the various figures of the drawings, the same reference symbols are appended, and repeated detailed explanation will be curtailed.

Figure 2:
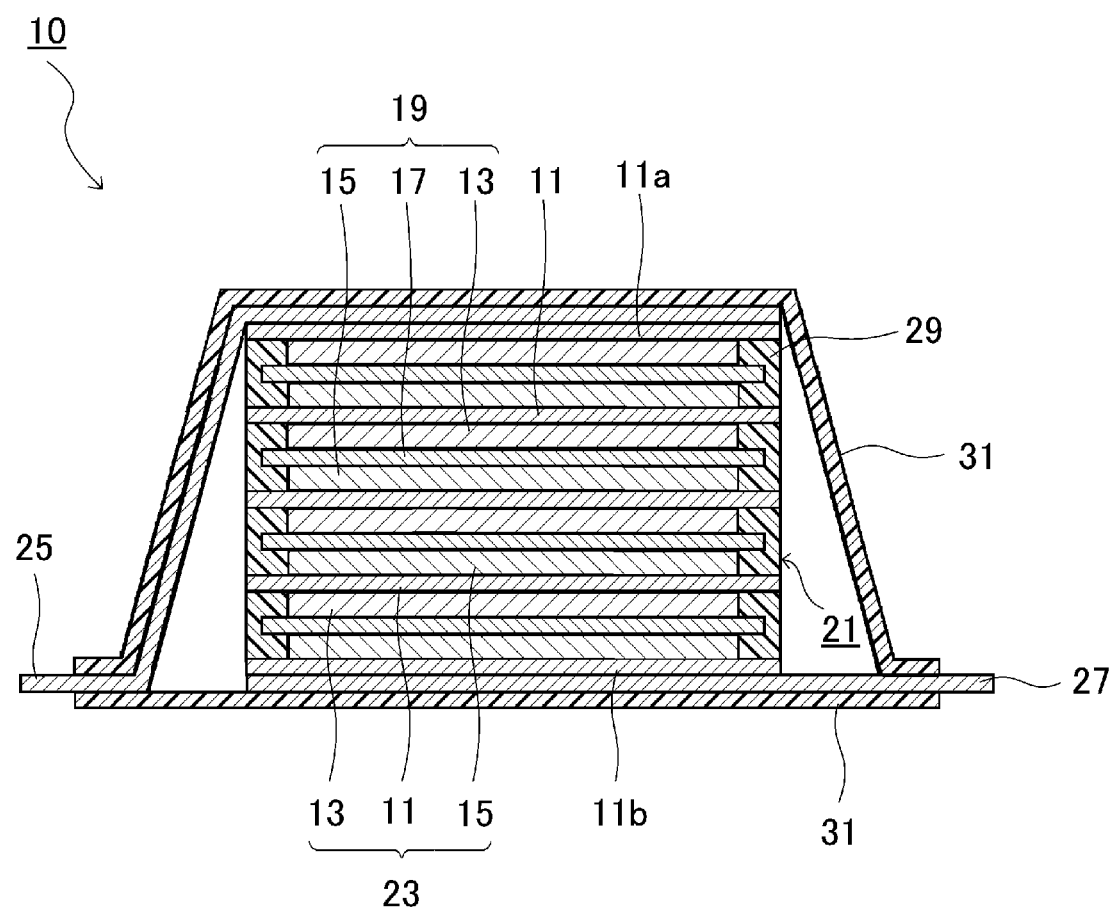
FIG. 2 is a schematic sectional view showing a cross section of the secondary cell shown in FIG. 1, taken along line II-II.
Figure 3:
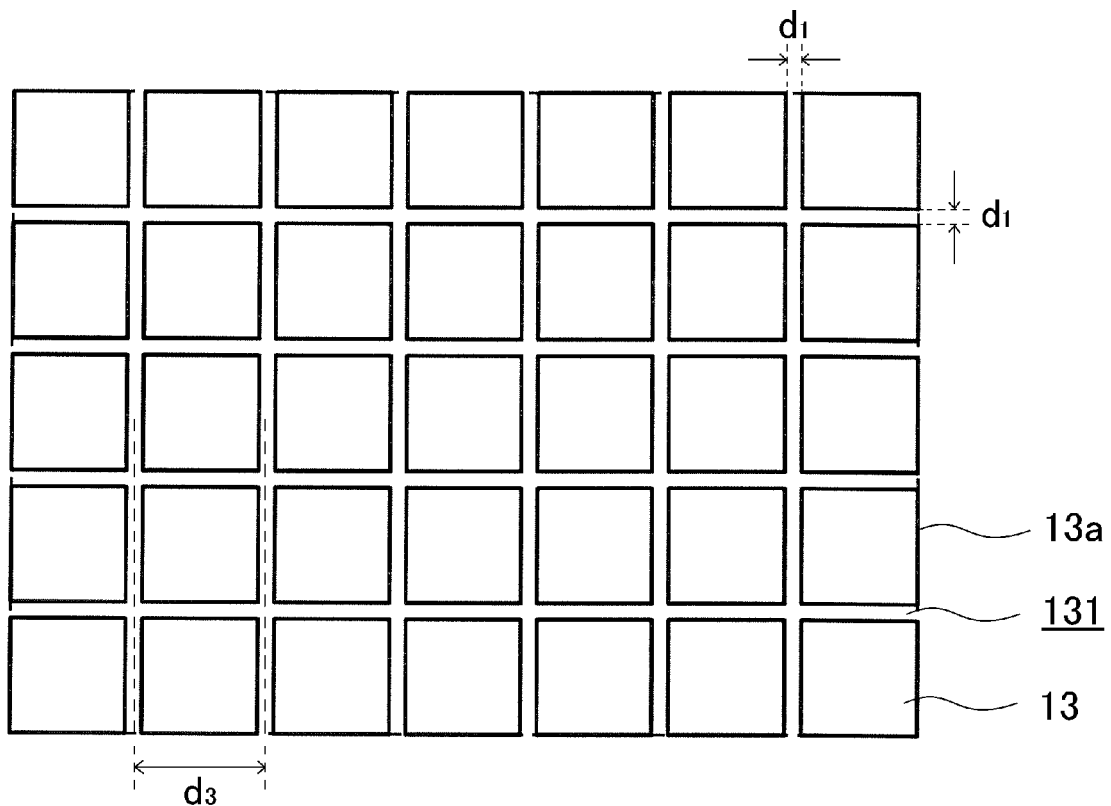
FIG. 3 is a schematic plan view showing a portion of an electrode for the secondary cell shown in FIG. 2.
Figure 4:
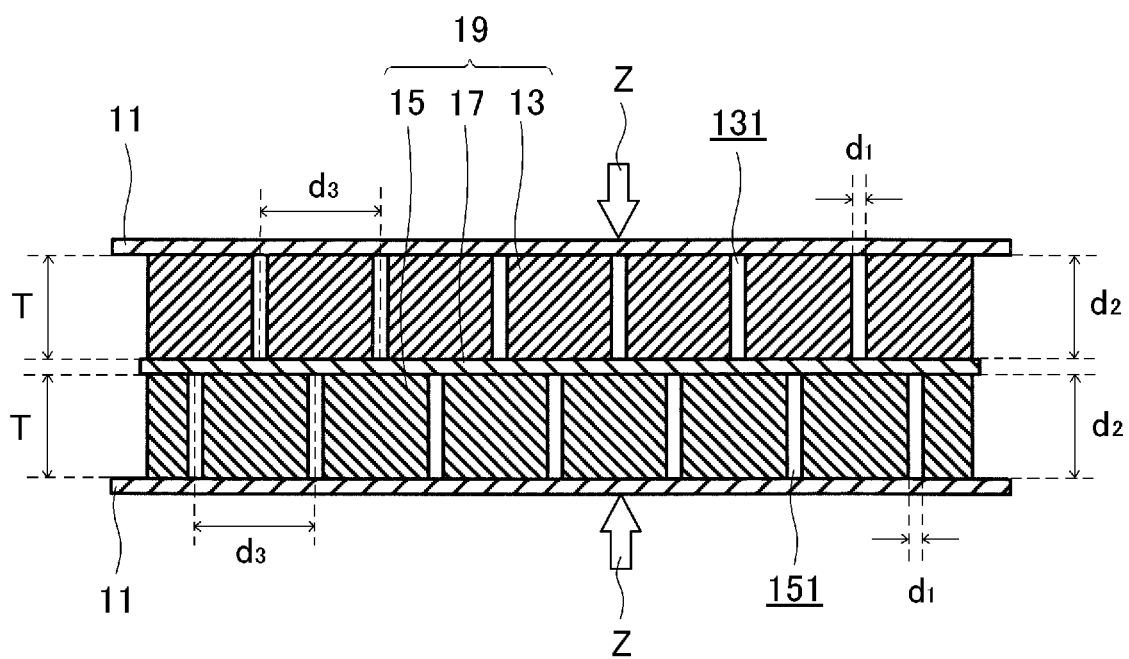
FIG. 4 is a schematic sectional view showing an example of a single cell layer of the secondary cell shown in FIG. 2.

FIG. 1 is a schematic perspective view showing the external appearance of a bipolar type lithium ion secondary cell, this being an example of a secondary cell according to an embodiment of the present invention. Moreover, FIG. 2 is a schematic sectional view showing a cross section of the bipolar type lithium ion secondary cell shown in FIG. 1, taken along line II-II. And FIG. 3 is a schematic plan view showing a portion of the electrode for the bipolar type lithium ion secondary cell shown in FIG. 2. Furthermore, FIG. 4 is a schematic sectional view showing an example of a single cell layer for the bipolar type lithium ion secondary cell shown in FIG. 2.

As shown in FIGS. 1 to 4, the bipolar type lithium ion secondary cell 10 of this embodiment has a structure in which a substantially rectangular power generation element 21 in which the actual charge/discharge reactions take place is sealed in the interior of an outer casing 31 that is formed from laminated film.

And, the power generation element 21 of this bipolar type lithium ion secondary cell 10 includes bipolar type electrodes 23, in which a positive electrode layer 13 is formed on one surface of a current collector 11, the positive electrode layer 13 being electrically coupled, and a negative electrode layer 15 is formed on the other surface of the current collector 11, the negative electrode layer 15 is electrically coupled. It should be understood that the positive electrode layer and the negative electrode layer are specific examples of electrode layers. The power generation element 21 is formed by these bipolar electrodes 23 being laminated together via electrolyte layers 17. And the electrolyte layer 17 has a structure in which electrolyte is held in the central portions in the in-plane direction of a separator which serve as base material. Here, the bipolar type electrodes 23 and the electrolyte layers 17 are laminated together alternately, so that the positive electrode layer 13 of one bipolar type electrode 23 and the negative electrode layer 15 of another bipolar type electrode 23 which is adjacent to that one bipolar type electrode 23 confront one another via an electrolyte layer 17. In other words, in this configuration, each of the electrolyte layers 17 is sandwiched between the positive electrode layer 13 of one bipolar type electrode 23 and the negative electrode layer 15 of another bipolar type electrode 23 that is adjacent to that one bipolar type electrode 23.

Moreover, an adjacent set consisting of a positive electrode layer 13, an electrolyte layer 17, and a negative electrode layer 15 constitutes one single cell layer 19. It may therefore be said that this bipolar type lithium ion secondary cell 10 has a structure in which single cell layers 19 are laminated together. Furthermore, a sealing portion 29 is disposed around the outer peripheral portion of the single cell layer 19. Due to this, mutual contact of liquid due to leakage of electrolytic solution from the electrolyte layer 17 is prevented, and the occurrence of short circuiting, which is caused by mutual contact of adjacent current collectors 11 in the secondary cell, or slight unevenness or the like in the end portions of the single cell layers 19 in the power generation element 21, is also prevented. It should be understood that, in the outermost layer current collector 11a on the positive electrode side that is positioned in the outermost layer of the power generation element 21, a positive electrode layer 13 is formed on only one side. Moreover, in the outermost layer current collector 11b on the negative electrode side that is positioned in the outermost layer of the power generation element 21, a negative electrode layer 15 is formed on only one side.

Furthermore, in this bipolar type lithium ion secondary cell 10, a positive electrode current collection plate 25 is disposed so as to be adjacent to the outermost layer current collector 11a on the positive electrode side, and this collection plate 25 is extended so as to be led out from the outer casing 31 that is formed from laminated film. On the other hand, a negative electrode current collection plate 27 is disposed so as to be adjacent to the outermost layer current collector 11b on the negative electrode side, and, in a similar manner, this collection plate 27 is extended so as to be led out from the outer casing 31.

The number of the single cell layers 19 that are laminated together is adjusted according to the desired voltage. Moreover, in this bipolar type lithium ion secondary cell 10, it would also be possible to reduce the number of the single cell layers 19 that are laminated together, so long as sufficient output can be ensured even though the thickness of the cell is made as thin as possible. Even in the case of this bipolar type lithium ion secondary cell 10, in order to prevent shock from the exterior and environmental deterioration during use, it is preferred to enclose the power generation element 21 under reduced pressure in the outer casing 31 that is formed from laminated film, and to provide a structure, in which the positive electrode current collection plate 25 and the negative electrode current collection plate 27 are led out to the exterior of this outer casing.

In the following, the main structural elements of the bipolar type lithium ion secondary cell of this embodiment will be explained.

Current Collector

The current collector 11 has the function of mediating the transfer of electrons from one surface which is in contact with the positive electrode layer to the other surface which is in contact with the negative electrode layer. The material for the current collector is not particularly limited, and, for example, a metal or an electrically conductive resin may be employed.

Specifically, a metal such as aluminum, nickel, iron, stainless steel, titanium, copper or the like may be suggested. In addition to these, it is preferable to employ a clad material made from nickel and aluminum, a clad material made from copper and aluminum, a plated material made from a combination of those metals, or the like. Moreover, a foil that is made by covering a metal surface with aluminum would also be acceptable. Among these, aluminum, stainless steel, copper, and nickel are preferable, from the standpoint of electron conductivity, cell operating potential, adhesiveness of the negative electrode active material to the current collector in sputtering, and so on.

Furthermore, as the latter resin with electrical conductivity, an electrically conductive polymer material or a non-electrically conductive polymer material, to which, an electrically conductive filler is added according to requirements, may be suggested. Examples of such an electrically conductive polymer material are, for example, polyaniline, polypyrrole, polythiophene, polyacetylene, polyparaphenylene, polyphenylenevinylene, polyoxadiazole, and so on. Since this type of electrically conductive polymer material has sufficient electric conductivity even without the addition of an electrically conductive filler, it is advantageous from the standpoint of simplification of the manufacturing process and reducing the weight of the current collector.

Moreover, examples of such a non-electrically conductive polymer material are polyethylene (PE: high density polyethylene (HDPE), low density polyethylene (LDPE), etc.), polypropylene (PP), polyethylene terephthalate (PET), polyether nitrile (PEN), polyimide (PI), polyamide-imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), polystyrene (PS), and so on. Non-electrically conductive polymer materials of this type have excellent voltage resistance and solvent resistance.

According to requirements, an electrically conductive filler may be added to the electrically conductive polymer material or to the non-electrically conductive polymer material described above. In particular, if the resin which is the base material of the current collector only consists of a non-electrically conductive polymer, then an electrically conductive filler is essential in order to give electrical conductivity to the resin.

The material that can be employed as the electrically conductive filler is not particularly limited, so long as it is a substance that is electrically conductive. For example, a metal or electrically conductive carbon or the like may be employed as material having excellent electrical conductivity, voltage resistance and lithium ion barrier properties and so on. The type of the metal is not particularly limited; however it is preferred for at least one metal selected from the group consisting of Ni, Ti, Al, Cu, Pt, Fe, Cr, Sn, Zn, In and Sb, or an alloy including these metals, or metal oxide, to be included. Moreover, the type of the electrically conductive carbon is not particularly limited. Preferably, at least one material selected from the group consisting of acetylene black, Vulcan, black pearl, carbon nanofibers, Ketjen black, carbon nanotubes, carbon nanohorns, and carbon nanoballoons is included.

The amount of the electrically conductive filler that is included is not particularly limited, so long as it is an amount that is capable of imparting sufficient electrical conductivity to the current collector; this amount is generally around 5% to 35% by mass.

It should be understood that the current collector may be made from a single material and have a single-layered structure, or may have a laminated structure in which layers made of those material are appropriately combined. From the standpoint of reducing the weight of the current collector, it is preferable for at least an electrically conductive resin layer made from an electrically conductive resin to be included. Moreover a metal layer may also be provided as a part of the current collector, from the standpoint of blocking the transfer of lithium ions between the single cell layers.

Positive Electrode Layer

The positive electrode layer 13 has gas flow passages 131 having the shape of grooves. The positive electrode layer 13 is made from a positive electrode layer forming material that includes a positive electrode active material and an ion conductive liquid. Furthermore, the positive electrode layer 13 is a non-bonded body formed from the positive electrode active material. It should be noted that the positive electrode layer forming material may include conventionally known components which are included in a positive electrode of a lithium ion secondary cell, such as gel forming polymer, a binder, a conductive adjuvant, an ion conductive polymer, or the like. Moreover, it is preferred for the viscosity of the positive electrode layer forming material to be from 2.8 Pa·s or more and 7.7 Pa·s or less. And it is more preferable for the viscosity of the positive electrode layer forming material to be from 3.2 Pa·s or more and 7.1 Pa·s or less. In order to adjust the viscosity of the positive electrode layer forming material to be from 2.8 Pa·s or more and 7.7 Pa·s or less, the ratio of the solid components included in the positive electrode (the positive electrode active material, gel forming polymer, a binder, a conductive adjuvant and an ion conductive polymer) and the ion conductive liquid is adjusted. Furthermore, the ratio of the solid components included in the positive electrode and the ion conductive liquid may be adjusted by the presence or absence of gel forming polymer, a binder, a conductive adjuvant and an ion conductive polymer, and by the content of a positive electrode active material, gel forming polymer, a binder, a conductive adjuvant, an ion conductive polymer and an ion conductive liquid.

Moreover, in the preferred example shown in the figures, the ratio of the size d1 of the gas flow passages 131 in the in-plane direction of the positive electrode layer 13 to the thickness T of the positive electrode layer 13 is preferably 0.32 or less, but is not particularly limited. Furthermore, this ratio of the size d1 of the gas flow passages 131 in the in-plane direction of the positive electrode layer 13 to the thickness T of the positive electrode layer 13 is preferably 0.004 or more, more preferably 0.009 or more, and even more preferably 0.03 or more, but is not particularly limited.

Yet further, in the preferred example shown in the figures, the gas flow passages 131 communicate up to the outer peripheral edge 13a of the positive electrode layer 13, but this is not limitative. For example, although not shown in the figures, it would also be possible to employ a structure in which the gas flow passages do not communicate with the outer peripheral edge, or a structure in which one of the gas flow passages communicates with the outer peripheral edge. Moreover, in the example shown in the figures, the gas flow passages 131 are formed in a shape of a right angle crossing lattice, but this is not limitative. For example, although not shown in the figures, it would also be possible to employ a shape of a lattice, in which the gas flow passages are vertically or horizontally arranged in one direction.

Even further, in the preferred example shown in the figures, the surface pressure applied in the thickness direction of the positive electrode layer 13, as indicated by the arrow Z, is preferably 68.6 kPa or more and preferably 600 kPa or less, but is not particularly limited.

Still further, in the preferred example shown in the figures, it is preferred for one or both of the size d2 of the gas flow passages 131 in the thickness direction of the positive electrode layer 13 and the size d1 of the gas flow passages 131 in the in-plane direction of the positive electrode layer 13 to be 2 μm or more, and more preferably 3 μm or more, but this is not particularly limitative.

Moreover, in the preferred example shown in the figures, the positive electrode layer 13 has gas flow passages 131, with the interval d3 between adjacent gas flow passages 131 being preferably 30 mm or less, and more preferably 15 mm or less; but this is not particularly limitative.

Furthermore, in the preferred example shown in the figures, the thickness T of the positive electrode layer 13 is preferably 140 μm or more, and the ratio of the charging capacity of the negative electrode layer 15 to the charging capacity of the positive electrode layer 13 is preferably 1.05 or more, although this is not particularly limitative. And the thickness T of the positive electrode layer 13 is more preferably 250 μm or more, and yet more preferably 300 μm or more, but this is not particularly limitative. Moreover, the ratio of the charging capacity of the negative electrode layer 15 to the charging capacity of the positive electrode layer 13 is more preferably 1.08 or more; but this is not particularly limitative. And the ratio of the charging capacity of the negative electrode layer 15 to the charging capacity of the positive electrode layer 13 is preferably 1.3 or less, and more preferably 1.2 or less, but this is not particularly limitative.

Yet further, although not shown in the figures, the material for the positive electrode layer preferably includes resin such as gel forming polymer or a binder or the like, and it is preferable for the content of this resin in the material for the positive electrode layer to be 1% by mass or less or for no such resin to be included; but this is not particularly limitative.

Positive Electrode Active Material

The positive electrode active material is not particularly limited, and, while conventionally known positive electrode active material particles may be employed, it is preferable to employ a positive electrode active material in which the surface of the positive electrode active material particles is coated with resin.

It is preferable for the coating resin that coats the positive electrode active material to include gel forming polymer that absorbs the ion conductive liquid, and then swells and goes into a gel state. It is preferably for this gel forming polymer to include fluororesin, polyester resin, polyether resin, vinyl resin, urethane resin, polyamide resin, or a mixture thereof.

And a so-called acrylic resin containing, for example, methyl (meth)acrylate, ethyl (meth)acrylate, or butyl (meth) acrylate as an essential structural monomer is preferable as the vinyl resin.

Although this is not particularly limitative, it is preferable for the coating resin to be urethane resin (A) that is obtained by reacting the urethane resin described above with an active hydrogen component (a1) and an isocyanate component (a2).

Since the urethane resin (A) has flexibility, it is possible to alleviate volume change of the electrodes and to suppress expansion of the electrodes by covering the positive electrode active material of a lithium ion secondary cell with this urethane resin (A).

The active hydrogen component (a1) is not particularly limited, but it is preferred for it to include at least one material selected from the group consisting of polyether diol, polycarbonate diol, and polyester diol.

Examples of polyether diol include: polyoxyethylene glycol (hereinafter abbreviated as "PEG"), polyoxyethylene oxypropylene block copolymerized diol, polyoxyethylene oxytetramethylene block copolymerized diol; ethylene oxide adduct of low molecular weight glycols such as ethylene glycol, propylene glycol, 1,4-butane diol, 1,6-hexamethylene glycol, neopentyl glycol, bis(hydroxymethyl)cyclohexane, 4,4'-bis(2-hydroxyethoxy)-diphenylpropane and so on; condensation polyether ester diol, which is obtained by reacting PEG with a number average molecular weight of 2,000 or less with dicarboxylic acid (aliphatic dicarboxylic acid having 4 to 10 carbon atoms (such as succinic acid, adipic acid, sebacic acid), aromatic dicarboxylic acid having 8 to 15 carbon atoms (such as terephthalic acid, isophthalic acid) and so on); and mixtures of two or more of these.

If an oxyethylene unit is included in the polyether diol, then the amount of oxyethylene unit included is preferably 20% by mass or more, more preferably 30% by mass or more, and yet more preferably 40% by mass or more.

In addition, polyoxypropylene glycol, polyoxytetramethylene glycol (hereinafter abbreviated as PTMG), polyoxypropylene oxytetramethylene block copolymerized diol and the like may also be suggested.

Among these, the preferred are PEG, polyoxyethylene oxypropylene block copolymerized diol, and polyoxyethylene oxytetra-methylene block copolymerized diol; and PEG is particularly preferred.

Furthermore, only one type of polyether diol may be employed, or a mixture of two of more thereof may be employed.

Examples of polycarbonate diol includes polycarbonate polyol (for example polyhexamethylenecarbonate diol) that is prepared from one, two or more types of alkylene diols having alkylene groups with 4 to 12 carbon atoms, preferably 6 to 10 carbon atoms and more preferably 6 to 9 carbon atoms and a low molecular weight carbonate compounds (for example, dialkylcarbonate, in which the alkyl group has 1 to 6 carbon atoms, alkylenecarbonate having an alkylene group with 2 to 6 carbon atoms, diarylcarbonate having an aryl group with 6 to 9 carbon atoms and so on) by condensation while performing a dealcoholization reaction.

As the polyester diol, there may be suggested condensation polyester diol that is obtained by reacting low molecular weight diol and/or polyether diol having a number average molecular weight of 1,000 or less with one or more types of the previously described dicarboxylic acid, or polylactone diol that is obtained by ring-opening polymerization of lactone having 4 to 12 carbon atoms. For the low molecular weight diol described above, low molecular weight glycol, such as exemplified in the above described section relating to polyether diol, may be suggested. Examples of the polyether diol having a number average molecular weight of 1,000 or less as described above include polyoxypropylene glycol, PTMG, and so on. Examples of the lactone described above include ε-caprolactore, γ-valerolactone, and so on. Specific examples of the polyester diol described above include polyethylene adipate diol, polybutylene adipate diol, polyneopentylene adipate diol, poly(3-methyl-1,5-pentyleneadipate) diol, polyhexamethylene adipate diol, polycaprolactone diol, and mixtures of two or more thereof.

Moreover, the active hydrogen component (a1) may be a mixture of two or more of the polyether diol, polycarbonate diol and polyester diol described above.

The active hydrogen component (a1) preferably contains, as an essential component, polymerized diol (a11) having a number average molecular weight of 2,500 to 15,000. Examples of such polymerized diol include the polyether diol, polycarbonate diol and polyester diol described above.

The polymerized diol (a11) having a number average molecular weight of 2,500 to 15,000 is preferred because the hardness of the urethane resin is appropriately soft, and moreover the strength of the surface coating formed upon the active material becomes strong.

Moreover, a number average molecular weight of the polymerized diol (a11) is more preferably 3,000 to 12,500, and still more preferably 4,000 to 10,000.

The number average molecular weight of the polymerized diol (a11) can be calculated from the hydroxyl value of the polymerized diol.

The hydroxyl value can be measured according to the description in JIS K1557-1.

Furthermore, it is preferable for the active hydrogen component (a1) to include a polymerized diol with a number average molecular weight of 2,500 to 15,000 as an essential component, and for the solubility parameter of the above described polymerized diol (a11) (hereinafter abbreviated as the "SP value") to be 8.0 to 12.0 $(cal/cm^3)^{1/2}$. And the SP value of this polymerized diol (a11) is more preferably 8.5 to 11.5 $(cal/cm^3)^{1/2}$, and still more preferably 9.0 to 11.0 $(cal/cm^3)^{1/2}$.

The SP value is calculated by the Fedors method. The SP value is given by the following formula:

$$\text{SP value}(\delta) = (\Delta H/V)^{1/2}$$

In this formula, $\Delta H$ represents the molar heat of evaporation (cal), and V represents the molar volume $(cm^3)$.

Moreover, as $\Delta H$ and V, the total molar heat of evaporation ($\Delta H$) and the total molar volume (V) of a group of atoms, as described in "Polymer Engineering and Science, 1974, Vol. 14, No. 2, Robert F. Fedors (pp 151 to 153)", may be employed.

Those whose numerical values are close can easily mix with one another (i.e. compatibility is high), while those whose numerical values are apart from each other are not easily mixed with one another.

It is preferable for the SP value of the polymerized diol (a11) to be 8.0 to 12.0 $(cal/cm^3)^{1/2}$ from the standpoint of the absorption of the electrolytic solution in the urethane resin (A).

Furthermore, it is preferable for the active hydrogen component (a1) to contain a polymerized diol (a11) with a number average molecular weight of 2,500 to 15,000 as an essential component, and for the content of the polymerized diol (a11) described above to be 20 to 80% by mass with respect to the mass of the urethane resin (A). It is more preferable for the content of the polymerized diol (a11) to be 30 to 70% by mass, and yet more preferably 40 to 65% by mass.

It is preferable for the content of the polymerized diol (a11) to be 20 to 80% by mass from the standpoint of the absorption of the electrolytic solution in the urethane resin (A).

Furthermore, it is preferable for the active hydrogen component (a1) to contain a polymerized diol (a11) with a number average molecular weight of 2,500 to 15,000 and a chain extender (a13) as essential components.

Examples of the chain extender (a13) include low molecular weight diol having 2 to 10 carbon atoms [for example, ethylene glycol (hereinafter abbreviated as "EG"), propylene glycol, 1,4-butane diol (hereinafter abbreviated as 1,4-BG), diethylene glycol (hereinafter abbreviated as "DEG"), 1,6-hexamethylene glycol, and so on], diamines [aliphatic diamine having 2 to 6 carbon atoms (for example, ethylene diamine, 1,2-propylene diamine, and so on), alicyclic diamine having 6 to 15 carbon atoms (for example, isophorone diamine, 4,4'-diaminodicyclohexylmethane, and so on), aromatic diamine having 6 to 15 carbon atoms (for example 4,4'-diaminodiphenylmethane and so on), and so on], monoalkanolamine (for example monoethanol amine and so on), hydrazine or a derivative thereof (for example, adipic acid dihydrazide and so on), and a mixture of two or more of these. Among these, low molecular weight diol is preferable, and particularly preferred are EG, DEG, and 1,4-BG.

As a combination of the polymerized diol (a11) and the chain extender (a13), a combination of PEG as the polymerized diol (a11) and EG as the chain extender (a13), or a combination of polycarbonate diol as the polymerized diol (a11) and EG as the chain extender (a13) is preferred.

Moreover, it is preferred for the active hydrogen component (a1) to contain polymerized diol (a1) having a number average molecular weight of 2,500 to 15,000, diol (a12) other than the polymerized diol (a11) described above, and a chain extender (a13), and for the equivalent ratio of (a11) and (a12) {(a11)/(a12)} to be 10/1 to 30/1, and for the equivalent ratio of (a11) and the total equivalent mass of (a12) and (a13) {(a11)/{(a12)+(a13)} } to be 0.9/1 to 1.1/1.

It should be understood that it is more preferable for the equivalent ratio {(a11)/(a12)} between (a11) and (a12) to be 13/1 to 25/1, and still more preferably 15/1 to 20/1.

The diol (a12) other than the polymerized diol (a11) is not particularly limited, so long as it is not a diol that is not included in the polymerized diol (a11) described above, and, specifically, diol with a number average molecular weight of less than 2,500 or diol with a number average molecular weight of more than 15,000 may be suggested.

Examples of diol of this type include the polyether diol, the polycarbonate diol and the polyester diol mentioned above, and so on.

It should be understood that the low molecular weight diol having 2 to 10 carbon atoms that is included in the chain extender (a13) are not included in the diol (a12) other than the polymerized diol (a11).

For the isocyanate component (a2), a material that is conventionally employed for manufacturing polyurethane may be employed. Such an isocyanate includes aromatic di-isocyanate having 6 to 20 carbon atoms (excluding carbon in the NCO group, the same applies hereinafter), aliphatic di-isocyanate having 2 to 18 carbon atoms, alicyclic di-isocyanate having 4 to 15 carbon atoms, ara-aliphatic di-isocyanate having 8 to 15 carbon atoms, modified substance of these di-isocyanates (modified carbo-di-imide, modified urethane, modified uretdione, and so on), and a mixture of two or more of those.

Specific examples of the aromatic di-isocyanate described above include 1,3- or 1,4-phenylene di-isocyanate, 2,4- or 2,6-tolylene di-isocyanate, 2,4'- or 4,4'-diphenylmethane di-isocyanate (hereinafter, diphenylmethane di-isocyanate will be abbreviated as "MDI"), 4,4'-di-isocyanatobiphenyl, 3,3'-dimethyl-4,4'-di-isocyanatobiphenyl, 3,3'-dimethyl-4, 4'-diisocyanatodiphenylmethane, 1,5-naphthylene di-isocyanate, and so on.

Specific examples of the aliphatic di-isocyanate described above include ethylene di-isocyanate, tetramethylene di-isocyanate, hexamethylene di-isocyanate, dodecamethylene di-isocyanate, 2,2,4-trimethylhexamethylene di-isocyanate, lysine di-isocyanate, 2,6-di-isocyanatomethyl caproate, bis (2-isocyanatoethyl) carbonate, 2-isocyanatoethyl-2,6-di-isocyanatohexanoate, and so on.

Specific examples of the alicyclic di-isocyanate described above include isophorone di-isocyanate, dicyclohexylmethane-4,4'-di-isocyanate, cyclohexylene di-isocyanate, methylcyclohexylene di-isocyanate, bis (2-isocyanatoethyl)-4-cyclohexylene-1,2-dicarboxylate, 2,5- or 2,6-norbornane di-isocyanate, and so on.

Specific examples of the araaliphatic di-isocyanate described above include m- or p-xylylene di-isocyanate, α,α, α',α'-tetramethylxylylene di-isocyanate, and so on.

Among these, aromatic di-isocyanate and alicyclic di-isocyanate are preferred, and aromatic di-isocyanate is more preferred, and in particular MDI is preferred.

When the urethane resin (A) contains the polymerized diol (a11) and the isocyanate component (a2), it is preferred for the equivalent ratio (a2)/(a11) to be 10 to 30/1, and it is more preferred for it to be 11 to 28/1. If the ratio of the isocyanate component (a2) is more than 30 equivalent, it becomes a hard coating layer.

When the urethane resin (A) contains the polymerized diol (a11), the chain extender (a13), and the isocyanate component (a2), it is preferred for the equivalent ratio (a2)/[(a11)+(a13)] to be normally 0.9 to 1.1/1, and preferably to be 0.95 to 1.05/1. When outside of this range, the urethane resin may not have sufficiently high molecular weight.

A number average molecular weight of the urethane resin (A) is preferably 40,000 to 500,000, and more preferably is 50,000 to 400,000. When the number average molecular weight of the urethane resin (A) is less than 40,000, the strength of the surface coating decreases, while, when it is more than 500,000, the viscosity of the solution becomes high, and a uniform surface coating may not be obtained.

The number average molecular weight of the urethane resin (A) is measured by gel permeation chromatography (hereinafter abbreviated as "GPC"), using dimethyl formamide (hereinafter abbreviated as "DMF") as the solvent, and taking polyoxypropylene glycol as the standard substance. The sample concentration is 0.25% by mass, the column stationary phase is a connection of one TSKgel Super H2000, one TSKgel Super H3000 and one TSKgel Super H4000 (all manufactured by Tosoh Corp. Ltd.), and the column temperature may be set to 40° C.

The urethane resin (A) may be prepared by reacting the active hydrogen component (a1) and the isocyanate component (a2).

For example, using the polymerized diol (a11) and the chain extender (a13) as the active hydrogen component (a1), a one shot method in which the isocyanate component (a2), the polymerized diol (a11) and the chain extender (a13) are simultaneously reacted, or a prepolymer method in which the polymerized diol (a11) and the isocyanate component (a2) are reacted at first, and subsequently the chain extender (a13) is reacted, may be suggested.

Moreover, the preparation of the urethane resin (A) may be performed either in the presence or in the absence of a solvent that is inert to the isocyanate group. As a solvent that is suitable in case of performing in the presence of the solvent, amide based solvent [DMF, dimethyl acetamide, and so on], sulfoxide based solvent (dimethyl sulfoxide and so on), ketone based solvent [methyl ethyl ketone, methyl isobutyl ketone, and so on], aromatic based solvent (toluene, xylene, and so on), ether based solvent (dioxane, tetrahydrofuran and so on), ester based solvent (ethyl acetate, butyl acetate, and so on), and a mixture of two or more of these solvents may be suggested. Among these, amide based solvent, ketone based solvent, aromatic based solvent, and a mixture of two or more of these are preferred.

In the preparation of the urethane resin (A), the reaction temperature may be the same as the temperature normally employed in a urethanation reaction; and if a solvent is used this temperature is usually 20 to 100° C., while if no solvent is used it is usually 20 to 220° C.

In order to promote the reaction, if necessary, a catalyst that is usually used in a polyurethane reaction [for example, an amine based catalyst (triethyl amine, triethylene diamine, or the like), or a tin based catalyst (dibutyl tin dilaurate or the like] may be employed.

Moreover, if necessary, it is also possible to employ a reaction terminating agent [for example, a monohydric alcohol (ethanol, isopropyl alcohol, butanol, and so on), or a monovalent amine (dimethyl amine, dibutyl amine, and so on) or the like].

The preparation of the urethane resin (A) may be performed with a manufacturing apparatus conventionally employed in this technical field. Moreover, if a solvent is not employed, then manufacturing equipment such as a kneader or an extruder may be employed. The urethane resin (A) manufactured in this manner normally has a solution viscosity of 10 to 10,000 poise at 20° C., measured as a 30% by mass (solid content) DMF solution, and in practice it is preferable for this to be 100 to 2,000 poise at 20° C.

Moreover, although this is not particularly limitative, it is preferred for the coating resin to include a polymer (B) having a vinyl monomer (b) as an essential constituent monomer. Since the polymer (B) having the vinyl monomer (b) as an essential constituent is flexible, accordingly it is possible to alleviate change of volume of the electrode and suppress expansion of the electrode by covering the positive electrode active material of the lithium ion secondary cell with the polymer (B).

In particular, as the vinyl monomer (b), it is preferable to include a vinyl monomer (b1) having a carboxyl group and a vinyl monomer (b2) represented by the general formula (I) shown below:

CH2=C(R1)COOR2            (1)

[In formula (1), R1 is a hydrogen atom or a methyl group, and R2 is a branched alkyl group having 4 to 36 carbon atoms.]

Examples of the vinyl monomer (b1) having a carboxyl group are: monocarboxylic acid having 3 to 15 carbon atoms, such as (meth)acrylic acid, crotonic acid, cinnamic acid, and so on; dicarboxylic acid having 4 to 24 carbon atoms, such as (anhydrous) maleic acid, fumaric acid, (anhydrous) itaconic acid, citraconic acid, mesaconic acid, and so on; 3 to 4 or more valent polycarboxylic acid having 6 to 24 carbon atoms, such as aconitic acid and so on. Among these, (meth)acrylic acid is preferable, and methacrylic acid is particularly preferable.

In the vinyl monomer (b2) represented by the above general formula (1), R1 represents a hydrogen atom or a methyl group. R1 is preferably a methyl group.

R2 is a branched alkyl group having 4 to 36 carbon atoms, and specific examples of R2 include: a 1-alkyl group (a 1-methylpropyl group (a sec-butyl group), a 1,1-dimethylethyl group (a tert-butyl group), a 1-methylbutyl group, a 1-ethylpropyl group, a 1,1-dimethylpropyl group, a 1-methylpentyl group, a 1-ethylbutyl group, a 1-methylhexyl group, a 1-ethylpentyl group, a 1-methylheptyl group, a 1-ethylhexyl group, a 1-methyloctyl group, a 1-ethylheptyl group, a 1-methylnonyl group, a 1-ethyloctyl group, a 1-methyldecyl group, a 1-ethylnonyl group, a 1-butyleicosyl group, a 1-hexyloctadecyl group, a 1-octylhexadecyl group, a 1-decyltetradecyl group, a 1-undecyltrydecyl group and so on), a 2-alkylalkyl group (a 2-methylpropyl group (an isobutyl group), a 2-methylbutyl group, a 2-ethylpropyl group, a 2,2-dimethylpropyl group, a 2-methylpentyl group, a 2-ethylbutyl group, a 2-methylhexyl group, a 2-ethylpentyl group, a 2-methylheptyl group, a 2-ethylhexyl group, a 2-methyloctyl group, a 2-ethylheptyl group, a 2-methylnonyl group, a 2-ethyloctyl group, a 2-methyldecyl group, a 2-ethylnonyl group, a 2-hexyloctadecyl group, a 2-octylhexadecyl group, a 2-decyltetradecyl group, a 2-undecyltrydecyl group, a 2-dodecylhexadecyl group, a 2-trydecylpentadecyl group, a 2-decyloctadecyl group, a 2-tetradecyloctadecyl group, a 2-hexadecyloctadecyl group, a 2-tetradecyleicosyl group, a 2-hexadecyleicosyl group and so on), a 3 to 34-alkylalkyo group (a 3-alkylalkyo group, 4-alkylalkyl group, a 5-alkylalkyl group, a 32-alkylalkyl group, a 33-alkylalkyl group, a 34-alkylalkyl group and so on), and a mixed alkyl group containing one or more branched alkyl groups such as an alkyl residue of oxoalcohol corresponding to a propylene oligomer (7 to 11-mer), an ethylene/propylene (molar ratio 16/1 to 11/1) oligomer, an isobutylene oligomer (7 to 8-mer) and an α-olefin (5 to 20 carbon atoms) oligomer (4 to 8-mer), and so on.

Among these, a 2-alkylalkyl group is preferred from the standpoint of absorption of the electrolytic solution, and a 2-ethylhexyl group and a 2-decyltetradecyl group are more preferred.

Moreover, apart from the vinyl monomer (b1) and the vinyl monomer (b2) represented by the general formula (1) given above, a co-polymerizable vinyl monomer (b3) containing no active hydrogen may also be included in the monomer constituting the polymer (B).

Examples of such a co-polymerizable vinyl monomer (b3) containing no active hydrogen are given as (b31) to (b35) below.

(b31) Carbyl (meth)acrylate formed from monool having 1 to 20 carbon atoms and (meth)acrylic acid.

Examples of the monol include (i) aliphatic monool [methanol, ethanol, n- and i-propyl alcohol, n-butyl alcohol, n-pentyl alcohol, n-octyl alcohol, nonyl alcohol, decyl alcohol, lauryl alcohol, tridecyl alcohol, myristyl alcohol, cetyl alcohol, stearyl alcohol, and so on], (ii) alicyclic monool [cyclohexyl alcohol and so on], (iii) araaliphatic monool [benzyl alcohol and so on], and a mixture of two or more of those.

(b32) Poly (n=2 to 30) oxyalkylene (2 to 4 carbon atoms) alkyl (1 to 18 carbon atoms) ether (meth)acrylate [ethylene oxide (hereinafter abbreviated as "EO") 10 mol adduct (meth)acrylate of methanol, propylene oxide (hereinafter abbreviated as "PO") 10 mol adduct (meth)acrylate of methanol, and so on]

(b33) vinyl compounds containing nitrogen.

(b33-1) vinyl compounds containing an amide group.

(i) (Meth)acrylic amide compounds having 3 to 30 carbon atoms, for example N,N-dialkyl (1 to 6 carbon atoms) or diaralkyl (7 to 15 carbon atoms) (meth)acrylamide [N,N-dimethyl acrylamide, N,N-dibenzyl acrylamide, and so on], diacetone acrylic amide.

(ii) Other vinyl compounds containing an amide group having 4 to 20 carbon atoms than the (meth)acrylic amide compounds mentioned above, for example, N-methyl-N-vinyl acetamide or cyclic amide (pyrrolidone compounds (6 to 13 carbon atoms, for example N-vinyl pyrrolidone or the like)).

(b33-2) (Meth)acrylate compounds.

(i) Dialkyl (1 to 4 carbon atoms) amino alkyl (1 to 4 carbon atoms) (meth)acrylate N,N-dimethylaminoethyl (meth)acrylate, N,N-diethylaminoethyl (meth)acrylate, t-butylaminoethyl (meth)acrylate, morpholinoethyl (meth) acrylate, or the like).

(ii) (Meth)acrylate containing a quaternary ammonium group [quaternarized (meth)acrylate containing a tertiary amino group (i.e. compounds quaternarized by using the above mentioned quaternarizing agents) [N,N-dimethylaminoethyl (meth)acrylate, N,N-diethylaminoethyl (meth)acrylate or the like] or the like.]

(b33-3) Vinyl compounds containing a heterocyclic ring.

Pyridine compounds (7 to 14 carbon atoms, for example 2- and 4-vinyl pyridine), imidazole compounds (5 to 12 carbon atoms, for example N-vinyl imidazole), pyrrole compounds (6 to 13 carbon atoms, for example N-vinyl pyrrole), and pyrrolidone compounds (6 to 13 carbon atoms, for example N-vinyl-2-pyrrolidone).

(b33-4) Vinyl compounds containing a nitrile group

Vinyl compounds with 3 to 15 carbon atoms containing a nitrile group, for example (meth)acrylonitrile, cyanostyrene, and cyanoalkyl (1 to 4 carbon atoms) acrylate.

(b33-5) Other vinyl compounds.

Vinyl compounds containing a nitro group (8 to 16 carbon atoms, for example nitrostyrene), or the like.

(b34) Vinyl hydrocarbon (b34-1) Aliphatic vinyl hydrocarbon

Olefins having 2 to 18 or more carbon atoms [ethylene, propylene, butene, isobutylene, pentene, heptene, di-isobutylene, octene, dodecene, octadecene, and so on], and dienes having 4 to 10 or more carbon atoms [butadiene, isoprene, 1,4-pentadiene, 1,5-hexadiene, 1,7-octadiene, and so on], or the like.

(b34-2) Alicyclic vinyl hydrocarbon

Unsaturated cyclic compounds having 4 to 18 or more carbon atoms, for example cycloalkene (such as cyclohexene), (di)cycloalkadiene [such as (di)cyclopentadiene], and terpene (such as pinene, limonene and indene).

(b34-3) Aromatic vinyl hydrocarbon

Unsaturated aromatic compounds having 8 to 20 or more carbon atoms and derivatives thereof, for example styrene, α-methylstyrene, vinyltoluene, 2,4-dimethylstyrene, ethylstyrene, isopropylstyrene, butylstyrene, phenylstyrene, cyclohexylstyrene, benzylstyrene, and lithium styrene sulfonate.

(b35) Vinyl ester, vinyl ether, vinyl ketone, and unsaturated dicarboxylic diester (b35-1) Vinyl ester Aliphatic vinyl ester [4 to 15 carbon atoms, for example alkenyl ester of aliphatic carboxylic acid (mono- and di-carboxylic acid) (for example, vinyl acetate, vinyl propionate, vinyl butyrate, diallyl adipate, isopropenyl acetate, and vinyl methoxy acetate)].

Aromatic vinyl ester [9 to 20 carbon atoms, for example alkenyl ester of aromatic carboxylic acid (mono- and di-carboxylic acid) (for example, vinyl benzoate, diallyl phthalate, and methyl-4-vinyl benzoate), and ester of aliphatic carboxylic acid containing an aromatic ring (for example, acetoxy styrene)].

(b35-2) Vinyl ether

Aliphatic vinyl ether (3 to 15 carbon atoms, for example vinyl alkyl (1 to 10 carbon atoms) ether [vinyl methyl ether, vinyl butyl ether, vinyl 2-ethylhexyl ether, or the like], vinylalkoxy (1 to 6 carbon atoms) alkyl (1 to 4 carbon atoms) ether [vinyl-2-methoxy ethyl ether, methoxybutadiene, 3,4-dihydro-1,2-pyran, 2-butoxy-2'-vinyloxy diethyl ether, vinyl-2-ethylmercapto ethyl ether, or the like], and poly (2 to 4) (meth)allyloxy alkane (2 to 6 carbon atoms) [diallyloxyethane, triallyloxyethane, tetraallyloxybutane, tetramethallyloxyethane, or the like].

Aromatic vinyl ether (8 to 20 carbon atoms, for example vinyl phenyl ether or phenoxystyrene).

(b35-3) Vinyl ketone

Aliphatic vinyl ketone (4 to 25 carbon atoms, for example vinyl methyl ketone or vinyl ethyl ketone).

Aromatic vinyl ketone (9 to 21 carbon atoms, for example vinyl phenyl ketone).

(b35-4) Unsaturated dicarboxylic diester

Unsaturated dicarboxylic diester having 4 to 34 carbon atoms, for example dialkyl fumarate (two alkyl groups are straight chain, branched chain, or alicyclic groups having 1 to 22 carbon atoms), dialkyl maleate (two alkyl groups are straight chain, branched chain, or alicyclic groups having 1 to 22 carbon atoms.).

From the standpoint of absorption of the electrolytic solution and the voltage resistance, (b31), (b32), (b33) and (b34) among the above examples of (b3) are preferred, and methyl (meth)acrylate, ethyl (meth)acrylate, and butyl (meth)acrylate in (b31) and lithium styrene sulfonate in (b34) are more preferred.

In the polymer (B), with regard to the content of vinyl monomers having a carboxyl group (b1), the content of vinyl monomers given by the general formula (1) described above (b2), and the content of co-polymerizable vinyl monomers not containing active hydrogen (b3), it is desirable for the content of (b1) to be 0.1 to 80% by mass, for the content of (b2) to be 0.1 to 99.9% by mass, and for the content of (b3) to be 0 to 99.8% by mass.

When the content of the monomers are within the ranges described above, the performance for absorption of the electrolytic solution becomes satisfactory.

More preferable content is 30 to 60% by mass for (b1), 5 to 60% by mass for (b2) and 5 to 80% by mass for (b3); and, even more preferable content is 35 to 50% by mass for (b1), 15 to 45% by mass for (b2) and 20 to 60% by mass for (b3).

A preferred lower limit for the number average molecular weight of the polymer (B) is 3,000, more preferably 50,000, yet more preferably 100,000, and most preferably 200,000; and a preferred upper limit therefor is 2,000,000, more preferably 1,500,000, yet more preferably 1,000,000, and most preferably 800,000.

The number average molecular weight of the polymer (B) may be obtained by GPC (gel permeation chromatography) measurement under the following conditions:
Apparatus: Alliance GPC V200 (manufactured by Waters Co. Ltd.).
Solvent: orthodichlorobenzene.
Reference material: polystyrene.
Sample concentration: 3 mg/ml.
Column stationary phase: PL gel 10 two MIXED-B in series (manufactured by Polymer Laboratories Co. Ltd.).
Column temperature: 135° C.

The solubility parameter (i.e. a SP value) of the polymer (B) is preferably 9.0 to 20.0 (cal/cm3)1/2. It is more desirable for the SP value of the polymer (B) to be 9.5 to 18.0 (cal/cm3)1/2, and it is yet more desirable for it to be 9.5 to 14.0 (cal/cm3)1/2. It is desirable for the SP value of the polymer (B) to be 9.5 to 20.0 (cal/cm3)1/2 from the standpoint of absorption of the electrolytic solution.

Furthermore, from the standpoint of heat resistance of the cell, it is preferable for the glass transition temperature of the polymer (B) [hereinafter abbreviated as "Tg", with the method of measurement being DSC (differential scanning calorimetry)] to be 80 to 200° C., more preferably 90 to 180° C., and yet more preferably 100 to 150° C.

The polymer (B) may be prepared by a conventionally known polymerization method (bulk polymerization, solution polymerization, emulsion polymerization, suspension polymerization, or the like). Polymerization may be performed by using a conventionally known polymerization initiator [such as an azo based initiator [2,2-azobis (2-methylproprionitrile), 2,2'-azobis (2,4-dimethyl valeronitrile or the like), a peroxide based initiator (benzoyl peroxide, di-t-butyl peroxide, lauryl peroxide, or the like)] and so on] may be employed.

Based upon the total mass of the monomer, the amount of the polymerization initiator to be used is preferably 0.01 to 5% by mass, and more preferably 0.05 to 2% by mass.

Examples of the solvent to be used in the case of solution polymerization include, for example, ester (2 to 8 carbon atoms, for example ethyl acetate and butyl acetate), alcohol (1 to 8 carbon atoms, for example methanol, ethanol, and octanol), hydrocarbon (4 to 8 carbon atoms, for example n-butane, cyclohexane and toluene), amide (for example, DMF and dimethyl acetamide), and ketone (3 to 9 carbon atoms, for example, methyl ethyl ketone); on the basis of the total mass of the monomer, the amount to be used is usually 5 to 900%, preferably 10 to 400%; and the monomer concentration is usually 10 to 95% by mass, and preferably 20 to 90% by mass.

Examples of the dispersion medium for emulsion polymerization and suspension polymerization that may be suggested include water, alcohol (for example, ethanol), ester (for example, ethyl proprionate), light naptha, and so on; and examples of the emulsifier that may be suggested include higher fatty acid (10 to 24 carbon atoms) metal salt (for example, sodium oleate and sodium stearate), higher alcohol (10 to 24 carbon atoms), sulfate metal salt (for example, sodium lauryl sulfate), ethoxylated tetramethyldecyn diol, sodium sulfoethyl methacrylate, dimethylaminomethyl methacrylate, and the like. Furthermore, polyvinyl alcohol, polyvinyl pyrrolidone, or the like may be added as a stabilizer.

The monomer concentration of the solution or dispersion is usually 5 to 95% by mass, and, the amount of the polymerization initiator used is usually 0.01 to 5% on the basis of the total mass of the monomer, and, from the standpoint of adhesive strength and cohesive strength, is preferably 0.05 to 2%.

Conventionally known chain transfer agents that may be used for the polymerization include, for example, mercapto compound (dodecyl mercaptan, n-butyl mercaptan, and so on) and halogenated hydrocarbon (carbon tetrachloride, carbon tetrabromide, benzyl chloride, and so on). On the basis of the total mass of the monomer, the amount used is usually 2% or less, and, from the standpoint of adhesive strength and cohesive strength, is preferably 0.5% or less.

The temperature in the system for the polymerization reaction is usually −5 to 150° C., and preferably 30 to 120° C.; the reaction time is usually 0.1 to 50 hours, and preferably 2 to 24 hours; and the end point of the reaction may be confirmed by the reduction of the amount of non-reacted monomer to typically 5% by mass or less, and preferably 1% by mass or less, of the total amount of the monomer used.

Furthermore, although this is not particularly limitative, the coating resin may be a cross-linked polymer, in which the polymer (B) is cross-linked with polyepoxy compound (c1) and/or polyol compound (c2).

In the cross-linked polymer, it is preferable to crosslink the polymer (B) by employing a cross-linking agent (C) having a reactive functional group that reacts with active hydrogen in the polymer (B), such as a carboxyl group or the like; and it is preferred to use polyepoxy compound (c1) and/or polyol compound (c2) as the cross-linking agent (C).

As the polyepoxy compound (c1), that having 80 to 2,500 of an epoxy equivalent may be suggested, such as, for example, glycidyl ether [bisphenol A diglycidyl ether, bisphenol F diglycidyl ether, pyrogallol triglycidyl ether, ethylene glycol diglycidyl ether, propylene glycol diglycidyl ether, neopentyl glycol diglycidyl ether, trimethylol propane triglycidyl ether, glycerin triglycidyl ether, polyethylene glycol (MW 200 to 2,000) diglycidyl ether, polypropylene glycol (MW 200 to 2,000) diglycidyl ether, diglycidyl ether of alkylene oxide 1 to 20 mol adduct of bisphenol A, and so on); glycidyl ester (phthalic acid diglycidyl ester, trimellitic acid triglycidyl ester, diamer acid diglycidyl ester, adipic acid diglycidyl ester, and so on); glycidyl amine (N,N-diglycidyl aniline, N,N-diglycidyl toluidine, N,N, N',N'-tetraglycidyldiaminodiphenyl methane, N,N,N',N'-tetraglycidylxylyleneamine, 1,3-bis (N,N-diglycidylaminomethyl) cyclohexane, N,N,N',N'-tetraglycidylhexamethylene diamine and so on); aliphatic epoxide (epoxidized polybutadiene, epoxidized soybean oil, and so on); and alicyclic epoxide (limonene dioxide, dicyclopentadiene dioxide, and so on).

As the polyol compound (c2), low molecular weight polyhydric alcohol [aliphatic and alicyclic diol having 2 to 20 carbon atoms [EG, DEG, propylene glycol, 1,3-butylene glycol, 1,4-BG, 1,6-hexane diol, 3-methylpentane diol, neopentyl glycol, 1,9-nonan diol, 1,4-dihydroxycyclohexane, 1,4-bis(hydroxymethyl)cyclohexane, 2,2-bis(4,4'-hydroxycyclohexyl)propane and so on]; diol containing an aromatic ring having 8 to 15 carbon atoms [m- and p-xylylene glycol, 1,4-bis(hydroxyethyl)benzene and so on]; triol with 3 to 8 carbon atoms (glycerin, trimethylolpropane, and so on); polyhydric alcohol of the valency of 4 or more [pentaerithritol, α-methyl glucoside, sorbitol, xylitol, mannitol, glucose, fructose, sucrose, dipentaerythritol, polyglycerin (polymerization degree of 2 to 20), and so on]; and alkylene (2 to 4 carbon atoms) oxide thereof (polymerization degree of 2 to 30), and the like may be suggested.

From the standpoint of absorption of the electrolytic solution, the amount of the cross-linking agent (C) that is used is preferably such that the equivalent ratio of the active hydrogen containing group in the polymer (B) to the reactive functional group in (C) becomes 1:0.01 to 2, and more preferably 1:0.02 to 1.

As a method of cross-linking the polymer (B) by using the cross-linking agent (C), the method, in which the positive electrode active material of the lithium ion secondary cell is coated with a coating resin made from the polymer (B), followed by cross-linking, is suggested. Specifically the method, in which coated active material formed by coating the positive electrode active material of the lithium ion secondary cell with resin is prepared by mixing a resin solution that includes the positive electrode active material of the lithium ion secondary cell and the polymer (B) and removing the solvent, and then the positive electrode active material of the lithium ion secondary cell is coated with cross-linked polymer by causing removal of the solvent and cross-linking reaction by means of mixing a solution containing the cross-linking agent (C) into the coated active material and heating, may be suggested.

When the polyepoxy compound (c1) is employed as the cross-linking agent, the heating temperature is preferably set to 70° C. or higher; and, when the polyol compound (c2) is employed, it is preferably set to 120° C. or higher.

Moreover, fluoroplastic resin (D) is also preferable as the coating resin. As examples of such fluoroplastic resin (D), one or more (co) polymers of a fluorine containing monomer, fluorinated olefin containing, for example, 2 to 10 carbon atoms and 1 to 20 fluorine atoms (tetrafluoroethylene, hexafluoropropylene, perfluorohexylethylene or the like) and fluorinated alkyl (1 to 10 carbon atoms) (meth) acrylate [perfluorohexylethyl (meth)acrylate, perfluorooctyl ethyl (meth)acrylate or the like] may be suggested.

Furthermore, polyester resin (E) is also preferable as the coating resin. As examples of such polyester resin (E), a polycondensate of polyol and polycarboxylic acid may be suggested.

As examples of the polyol, diol (e1) and polyol with valency of 3 or more (e2) may be suggested, and, as examples of the polycarboxylic acid, dicarboxylic acid (e3) and polycarboxylic acid with valency of 3 or more (e4) may be suggested. Among these, non-linear polyester resin using the polyol with valency of 3 or more (e2) and/or polycarboxylic acid (e4) with valency of 3 or more together with the diol (e1), the dicarboxylic acid (e3) is preferred, and in particular polyester resin comprising four components (e1), (e2), (e3) and (e4) is preferred.

As examples of the diol (e1), there may be suggested: alkylene glycol (ethylene glycol, 1,2-propylene glycol, 1,3-propylene glycol, 1,4-butane diol, 1,6-hexane diol, dodecane diol or the like), alkylene ether glycol (DEG, triethylene glycol, dipropylene glycol, PEG, polyoxypropylene glycol, PTMG, and so on); alicyclic diol (1,4-cyclohexane dimethanol, hydrogenated bisphenol A, hydrogenated bisphenol F, and so on); bisphenol (bisphenol A, bisphenol F, bisphenol S and so on); alkylene oxide adduct of the above described alicyclic diol (EO, PO, butylene oxide, styrene oxide, α-olefin oxide, and so on); alkylene oxide adduct of the above described bisphenol (EO, PO, butylene oxide, styrene oxide, α-olefin oxide, and so on); and the like. Among these, preferred are alkylene glycol with 6 or more carbon atoms, alkylene oxide adduct of bisphenols, and alicyclic diol, and particularly preferred are PO, butylene oxide, styrene oxide, α-olefin oxide adducts of bisphenols, alkylene glycol with 8 or more carbon atoms, hydrogenated bisphenol A, hydrogenated bisphenol F, and combinations thereof.

As examples of the polyol with valency of 3 or more (e2), there may be suggested: polyhydric aliphatic alcohol with valence of 3 to 8 or more (glycerin, trimethylolethane, trimethylolpropane, pentaerithritol, sorbitol, and so on); trisphenols (trisphenol PA and so on); novolak resin (phenol novolak, cresol novolak, and so on); alkylene oxide adduct of the trisphenols described above; alkylene oxide adduct of the novolak resin described above; and the like. Among these, polyhydric aliphatic alcohol with valence of 3 to 8 or more and alkylene oxide adduct of novolak resin are preferred, and alkylene oxide adduct of novolak resin is particularly preferred.

As examples of the dicarboxylic acid (e3), there may be suggested: alkylene dicarboxylic acid (succinic acid, adipic acid, azelaic acid, sebacic acid, dodecane dicarboxlylic acid, octadecane dicarboxylic acid, dodecenyl succinic acid, pentadecenyl succinic acid, octadecenyl succinic acid, dimer acid, and so on); alkenylene dicarboxylic acid (maleic acid, fumaric acid, and so on); aromatic dicarboxylic acid (phthalic acid, isophthalic acid, telephthalic acid, naphthalene dicarboxylic acid, and so on), and the like. Among these, alkylene dicarboxylic acid with 6 to 50 carbon atoms, alkenylene dicarboxylic acid with 6 to 50 carbon atoms, aromatic dicarboxylic acid with 8 to 20 carbon atoms, and combination thereof are preferred; and alkylene dicarboxylic acid with 7 to 50 carbon atoms and combination thereof with aromatic dicarboxylic acid with 8 to 20 carbon atoms are more preferred; and alkenyl succinic acid with 16 to 50 carbon atoms and combination thereof with aromatic dicarboxylic acid with 8 to 20 carbon atoms are particularly preferred.

As examples of the polycarboxylic acid with valency of 3 or more (e4), there may be suggested aromatic polycarboxylic acid with 9 to 20 carbon atoms (trimellitic acid, pyromellitic acid, and so on), and vinyl polymer of unsaturated carboxylic acid (styrene/maleic acid copolymer, styrene/acrylic acid copolymer, α-olefin/maleic acid copolymer, styrene/fumaric acid copolymer, and so on). Among these, aromatic polycarboxylic acid with 9 to 20 carbon atoms is preferred, and trimellitic acid is particularly preferred.

It should be understood that, as the dicarboxylic acid (e3) or the polycarboxylic acid with valency of 3 or more (e4), it would also be acceptable to employ acid anhydride or lower alkyl ester (methyl ester, ethyl ester, isopropyl ester, or the like) of the above.

Moreover, it would also be possible to copolymerize hydroxycarboxylic acid (e5) together with (e1), (e2), (e3), and (e4). Examples of such hydroxycarboxylic acid (e5) include hydroxystearic acid, hardened castor oil fatty acid, and so on.

The ratio between the polyol and the polycarboxylic acid, as an equivalent ratio [OH]/[COOH] of the hydroxyl group [OH] and the carboxyl group [COOH], is usually 2/1 to 1/2, and preferably 1.5/1 to 1/1.5, and more preferably 1.3/1 to 1/1.3. The ratio of the polyol with valency of 3 or more (e2) and the polycarboxylic acid with valency of 3 or more (e4) is such that the sum of the number of moles of (e2) and (e4) is usually 0 to 40 mol %, and preferably 3 to 25 mol %, and more preferably 5 to 20 mol % with respect to the total number of moles of (e1) to (e4). Moreover, the molar ratio of (e2) and (e3) is usually 0/100 to 100/0, preferably 80/20 to 20/80, and more preferably 70/30 to 30/70.

From the standpoint of absorption of the electrolytic solution, it is preferable for the polyester resin (E) to have a number average molecular weight of 2,000 to 50,000.

The number average molecular weight of the polyester resin (E) may be measured by GPC. The GPC conditions employed for measurement of the number average molecular weight of the polyester resin (E) may, for example, be the following conditions:
Apparatus: HLC-8220GPC (liquid chromatograph, manufactured by Tosoh Co. Ltd.);
Column: TSKgel Super H4000+TSKgel Super H3000+ TSKgel Super H2000 (all manufactured by Tosoh Co. Ltd.).
Column temperature: 40° C.
Detector: RI (Refractive Index).
Solvent: tetrahydrofuran.
Flow rate: 0.6 ml/min.
Sample concentration: 0.25% by mass.
Amount injected: 10 µl.
Standard: polystyrene (TSK STANDARD POLYSTYRENE, manufactured by Tosoh Co. Ltd.).

The polyester resin (E) may be obtained by heating polycarboxylic acid and polyol to 150 to 280° C. in the presence of conventionally known esterification catalyst such as tetrabutoxy titanate or dibutyl tin oxide or the like, and dehydration condensation. It is also effective to reduce the pressure in order to increase the reaction rate at the end of the reaction.

Moreover, polyether resin (F) is also preferred as coating resin. As such polyether resin (F), for example, there may be suggested: a polyoxyalkylene glycol [polymerization degree of the oxyalkylene is 2 to 100 (it is preferred for the polymerization degree of oxyethylene to be 5 to 30, and oxyalkylene preferably has 2 to 4 carbon atoms); and the same holds for the polyether resin described below)] (for example, polyoxyethylene (polymerization degree of 20)/ polyoxypropylene (polymerization degree of 20) block co-polymer (pluronic type and so on) or the like], polyoxyalkylene alkyl ether (polymerization degree of the oxyalkylene is 2 to 100, the alkyl has 8 to 40 carbon atoms) (for example, octyl alcohol EO 20 mol adduct, lauryl alcohol EO 20 mol adduct, stearyl alcohol EO 10 mol adduct, oleyl alcohol EO 5 mol adduct, lauryl alcohol EO 10 molar PO 20 molar block adduct, and so on); polyoxyalkylene higher fatty acid ester (polymerization degree of the oxyalkylene is 2 to 100, the higher fatty acid has 8 to 40 carbon atoms) (for example. stearyl acid EO 10 mol adduct, lauric acid EO 10 mol adduct, and so on); polyoxyalkylene polyhydric alcohol higher fatty acid ester (polymerization degree of the oxyalkylene is 2 to 100, the polyhydric alcohol has 2 to 40 carbon atoms, the higher fatty acid has 8 to 40 carbon atoms) (for example, lauric acid diester of polyethylene glycol (polymerization degree of 20), oleic acid diester of polyethylene glycol (polymerization degree of 20), and so on); polyoxyalkylene alkyl phenyl ether (polymerization degree of the oxyalkylene is 2 to 100, the alkyl has 8 to 40 carbon atoms) (for example, nonylphenol EO 4 mol adduct, nonylphenol EO 8 mol PO 20 mol block adduct, octylphenol EO 10 mol adduct, bisphenol A EO 10 mol adduct, styrenated phenol EO 20 mol adduct, and so on); polyoxyalkylene alkyl amino ether (polymerization degree of the oxyalkylene is 2 to 100, the alkyl has 8 to 40 carbon atoms) and (for example, laurylamine EO 10 mol adduct, stearylamine EO 10 mol adduct, and so on); polyoxyalkylene alkanol amide (polymerization degree of the oxyalkylene is 2 to 100, the amide (the acyl moiety) has 8 to 24 carbon atoms) (for example, EO 10 mol adduct of hydroxyethyllauric acid amide, EO 20 mol adduct of hydroxypropyloleic acid amide, and so on); and it would also be acceptable to employ two or more of those in combination.

Moreover, polyamide resin (G) is also preferred as the coating resin. The polyamide resin (G) is not particularly limited, but is preferably resin that is obtained by condensation polymerization of polymerized fatty acid (g1) having at least 40% by mass of tribasic acid with 54 carbon atoms, aliphatic monocarboxylic acid with 2 to 4 carbon atoms (g2) and polyamine having ethylene diamine and aliphatic polyamine with 3 to 9 carbon atoms (g3).

As the polymerized fatty acid (g1), for example, there may be suggested those having the following composition, which is also referred to trimer acid, and which is residue obtained after collecting highly useful dibasic acid component with 36 carbon atoms following polymerization of, for example, unsaturated fatty acid such as oleic acid and linoleic acid or the like or lower alkyl ester (with 1 to 3 carbon atoms) thereof: Monobasic acid having 18 carbon atoms: 0 to 5% by mass (preferably 0 to 2% by mass); dibasic acid having 36 carbon atoms: less than 60% by mass (preferably less than 50% by mass); tribasic acid having 54 carbon atoms: 40% by mass or more (preferably 50% by mass or more).

Furthermore, if necessary, it would also be possible to replace a part of the above mentioned (g1) with other tribasic acid or tetrabasic acid. As that other tribasic acid or tetrabasic acid, trimellitic acid, pyromellitic acid, benzophenonetetracarboxylic acid, butanetetracarboxylic acid (including acid anhydride and alkyl ester with 1 to 3 carbon atoms thereof) and the like may be suggested.

Acetic acid, propionic acid, and butyric acid may be suggested as the aliphatic monocarboxylic acid (g2) having 2 to 4 carbon atoms; and these may be used alone or as a mixture in any desired proportions.

The amount of (g2) that is used is usually 20 to 40 equivalent % and preferably 30 to 40 equivalent % with respect to the total carboxylic acid component [(g1)+(g2)].

Examples of the aliphatic polyamine with 3 to 9 carbon atoms that constitutes the polyamine (g3) include diethylene triamine, propylene diamine, diaminobutane, hexamethylene diamine, trimethylhexamethylene diamine, imino bis-propyl amine, methylimino bis-propyl amine, and so on. This (g3) is a mixture of ethylene diamine and one or more aliphatic polyamine having 3 to 9 carbon atoms, and moreover the proportion of ethylene diamine included in this (g3) is usually 60 to 85 equivalent %, and preferably 70 to 80 equivalent %.

The number average molecular weight of the polyamide resin (G) is usually 3,000 to 50,000, and preferably 5,000 to 10,000.

The number average molecular weight of the polyamide resin (G) may be determined by GPC measurement under the following conditions:
Apparatus: HLC-802A (manufactured by Tosoh Corporation);
Column: two of TSKgel GMH6 (manufactured by Tosoh Corporation);
Measurement temperature: 40° C.;
Sample solution: 0.25 mass % DMF solution;
Solution injection volume: 200 µl;
Detector: RI;
Standard: polystyrene (TSK STANDARD POLYSTYRENE, manufactured by Tosoh Corporation).

From the standpoint of heat resistance of the cell, the melting point of the polyamide resin (G) as measured by a trace amount melting point measurement method (measured according to the melting point measurement method defined in JIS K0064-1992, 3.2, using a melting point measurement apparatus) is preferably 100 to 150° C., and more preferably 120 to 130° C.

The polyamide resin (G) may be prepared by the same method as the usual method for preparing polymerized fatty acid based polyamide resin. The reaction temperature for an amidation condensation polymerization reaction is usually 160 to 250° C., and preferably 180 to 230° C. In order to prevent coloring, the reaction is preferably performed in inert gas such as nitrogen gas or the like, and the reaction may also be carried out under reduced pressure in order to promote completion of the reaction and removal of volatile components at the end of the reaction. Moreover, after the amidation condensation polymerization reaction, it is also possible to dilute the reaction product with an alcohol based solvent such as methanol, ethanol, isopropanol, or the like, so as to bring it into a solution-like state.

Furthermore, as the coating resin, resin is preferred that, when immersed in the electrolyte, has a liquid absorption rate of 10% or more, and that has a tensile elongation rate at break of 10% or more in the saturated liquid absorption state. Furthermore, for example, epoxy resin, polyimide resin, silicone resin, phenol resin, melamine resin, urea resin, aniline resin, ionomer resin, polycarbonate, and the like can also be employed as other resin (H).

In this specification, "tensile elongation rate at break" is an index that specifies the flexibility of the coating resin, and is a value that is obtained, for example, by a measurement method according to ASTM D683 (test piece shape: Type II) after a resin sheet with its thickness of 500 μm is punched out into a dumbbell shape, and soaked for three days at 50° C. in an electrolytic solution (1 mol/L of LiPF6, ethylene carbonate (EC)/propylene carbonate (PC)=50/50 (mass ratio)). The value of the tensile elongation rate at break of the coating resin should be 10% or more, preferably 20% or more, more preferably 30% or more, particularly preferably 40% or more, and most preferably 50% or more. In summary, it is preferable for the value of the tensile elongation rate at break of the coating resin to be as great as possible.

It is preferable for a conductive adjuvant (X) further to be included in the coating resin.

The conductive adjuvant (X) should be selected from materials that are electrically conductive. Specific examples that may be suggested are metals {aluminum, stainless steel (SUS), silver, gold, copper, titanium, and so on}, carbon {graphite and carbon black [acetylene black, Ketjen black, furnace black, channel black, thermal lamp black, and so on] and the like}, and a mixture thereof.

One of these conductive adjuvants (X) may be employed alone, or two or more of them may be employed in combination. Furthermore, while alloy or metal oxide thereof may be used, this is not limitative. For example, electrically conductive polymer could also be employed. From the standpoint of electrical stability, electrically conductive material used for the conductive adjuvant (X) is preferably aluminum, stainless steel, carbon, silver, gold, copper, titanium and a mixture thereof, and more preferably is silver, gold, aluminum, stainless steel and carbon, and especially carbon is preferred. In this case, from the standpoint of maintaining the coating of the carbon material by suppressing intercalation and deintercalation of Li ions, it is preferable for the carbon material to have low crystallinity, and it is more preferable to employ acetylene black. Moreover, it would also be possible for this conductive adjuvant (X) to be those formed by coating electrically conductive material (metal among (X) described above) around particle-type ceramic material or resin material by plating or the like.

The shape (form) of the conductive adjuvant (X) is not limited to a particle form; for example, it could be other form than the particle form, such as a fiber form, or it could be in the form which is implemented in practice as so-called filler type electrically conductive resin composition, such as vapor-grown carbon fibers (VGCF) or carbon nanotubes or the like.

The average particle diameter of the conductive adjuvant (X) is not particularly limited, but is preferably around 0.01 to 10 μm from the standpoint of the electrical property of the cell. It should be understood that, in the present specification, "particle diameter" means the maximum distance L among the distances between any two points upon the contour of the conductive adjuvant (X). As the value of the "average particle diameter", it will be supposed that a value is employed that is calculated as the average value of the diameter of the particles observed in several to several tens of fields of view by using an observing means such as a scanning electron microscope (SEM) or a transmission electron microscope (TEM) or the like. From the standpoint of ease of performing the coating process, the particle form is preferred, and from the standpoint of electrical conductivity, the fiber form is preferred.

Although the compounding ratio of the coating resin and the conductive adjuvant (X) is not particularly limited, in terms of mass ratio, preferably the coating resin (resin solid content mass): the conductive adjuvant (X)=1 to 0.2 to 3.0.

The coating resin and the conductive adjuvant (X) may also be mixed together before coating of the positive electrode active material is performed. It is possible to coat the positive electrode active material of the lithium ion secondary cell with the coating resin containing the conductive adjuvant by mixing the coating resin, which is mixed with the conductive adjuvant in advance, further with the positive electrode active material of the lithium ion secondary cell.

Furthermore it would also be possible, when coating the positive electrode active material of the lithium ion secondary cell with the coating resin, to mix together the coating resin, the positive electrode active material of the lithium ion secondary cell, and the conductive adjuvant (X) at the same time, thereby forming the coating resin containing the conductive adjuvant (X) upon the surface of the positive electrode active material of the lithium ion secondary cell.

Yet further it would also be possible, when coating the positive electrode active material of the lithium ion secondary cell with the coating resin containing the conductive adjuvant (X), to mix the coating resin into the positive electrode active material of the lithium ion secondary cell, and further to mix the conductive adjuvant (X), so as to form the coating resin containing the conductive adjuvant (X) upon the surface of the positive electrode active material of the lithium ion secondary cell.

Additionally, the coating resin has the property of easily adhering to carbon material in particular. Therefore, although this is not particularly limitative, from the standpoint of providing an electrode material that has structural stableness, it is preferable to adhere the carbon material to the surface of the positive electrode active material, and then to coat with the coating resin.

The positive electrode active material has a composition that occludes ions during discharging, and that emits ions during charging.

It is preferred to employ metal oxide as the positive electrode active material. Generally, if metal oxide is used for the positive electrode active material, this is practical from the standpoint of the cell characteristics (capacity). However, when metal oxide is employed as the active material, then it may happen that sufficient adhesion force may not be obtained, since its affinity for the coating resin is not high. By contrast, it is possible to enhance the adhesion of the coating resin to the positive electrode active material by coating the surface of the positive electrode active material with the conductive adjuvant (X). Accordingly, from the standpoint of being able prominently to manifest the beneficial effects due to the use of the conductive adjuvant (X), it is preferable to employ metal oxide as the positive electrode active material.

Preferred metal oxide to be employed for the positive electrode active material include, for example, lithium-transition metal complex oxide, such as $LiMn_2O_4$, $LiCoO_2$, $LiNiO_2$, $LiFeO_2$, $Li_4Ti_5O_{12}$, Li(Ni—Mn—Co)$O_2$ and that in which a part of these transition metal has been replaced by other element or the like, or lithium-transition metal phosphate compound, such as $LiFePO_4$ or the like, or lithium-transition metal sulfate compound, and so on. According to circumstances, it would also be acceptable to employ two or more positive electrode active materials in combination. From the standpoint of capacity and output characteristics, a lithium-transition metal complex oxide or a lithium-transition metal phosphate compound is preferably employed as the positive electrode active material. More preferably, complex oxide containing lithium and nickel is employed, and yet more preferably Li(Ni—Mn—Co)$O_2$ or compound in which a part of those transition metal has been replaced by other element (hereinafter simply termed an "NMC complex oxide") is employed. NMC complex oxide has a layered crystalline structure in which layers of lithium atoms and layers of transition metal atoms (in which Mn, Ni, and Co are arranged in an ordered configuration) are stacked alternately with the interposition of layers of oxygen atoms, and includes one Li atom per each one atom of the transition metal M, and the amount of Li extracted is twice the amount of spinel group lithium manganese oxide, in other words the supply capacity is doubled, so that it is possible to have high capacity.

As described above, NMC complex oxide also includes complex oxide in which a part of the transition metal elements is replaced by other metal element. In this case, this other element is Ti, Zr, Nb, W, P, Al, Mg, V, Ca, Sr, Cr, Fe, B, Ga, In, Si, Mo, Y, Sn, V, Cu, Ag, Zn or the like, and preferably Ti, Zr, Nb, W, P, Al, Mg, V, Ca, Sr, or Cr; and more preferably Ti, Zr, P, Al, Mg, or Cr; and, from the standpoint of enhancing the cycling characteristics, even more preferably Ti, Zr, Al, Mg, or Cr.

Since the theoretical discharge capacity of NMC composite oxide is high, preferably, it has a composition given by the general formula (2): $Li_aNi_bMn_cCo_dM_xO_2$ (In this formula (2), a, b, c, d and x satisfy $0.9 \le a \le 1.2$, $0 < b < 1$, $0 < c \le 0.5$, $0 < d \le 0.5$, $0 \le x \le 0.3$, and $b+c+d=1$. And M is at least one element selected from Ti, Zr, Nb, W, P, Al, Mg, V, Ca, Sr, and Cr.). Here, a is the atomic ratio of Li, b is the atomic ratio of Ni, c is the atomic ratio of Co, d is the atomic ratio of Mn, and X is the atomic ratio of M. From the standpoint of cycling characteristics, b in the general formula (2) preferably satisfies the condition $0.4 \le b \le 0.6$. The composition of each element can, for example, be measured by an inductively coupled plasma (ICP) light emission analysis method.

In general, from the viewpoint of enhancing material purity and electronic conductivity, it is conventionally known that nickel (Ni), cobalt (Co), and manganese (Mn) contribute to the capacity and to the output characteristics. Ti and so on are included for partially replacing the transition metal in the crystal lattice.

As a preferred form, from the standpoint of enhancing the balance between the capacity and the lifetime performance, it is preferable for b, c and d in the general formula (2) to satisfy the conditions $0.49 \le b \le 0.51$, $0.29 \le c \le 0.31$, and $0.19 \le d \le 0.21$, respectively. For example, compared with $LiCoO_2$, $LiMn_2O_4$, $LiNi_{1/3}Mn_{1/3}Co_{1/3}O_2$ or the like, which are employed in a general cell for consumer use, $LiNi_{0.5}Mn_{0.3}Co_{0.2}O_2$ has the advantageous aspect that a cell that is compact and has high capacity can be manufactured, because the specific energy density can be improved due to the large capacity per unit mass. This is also preferable from the point of view of cruising distance. While $LiNi_{0.8}Co_{0.1}Al_{0.1}O_2$ is advantageous from the point of view that the capacity is larger, the lifetime characteristics are not excellent. By contrast, the lifetime characteristics of $LiNi_{0.5}Mn_{0.3}Co_{0.2}O_2$ is as excellent as those of $LiNi_{1/3}Mn_{1/3}Co_{1/3}O_2$.

As a matter of course, it would also be acceptable to employ a positive electrode active material other than those described above. Moreover, the average particle diameter of the positive electrode active material included in the positive electrode layer 13 is not particularly limited, but, from the standpoint of higher cell output, it should be preferably 1 to 100 and more preferably 1 to 20

Ion Conductive Liquid

An ion conductive liquid has the function of serving as a carrier of lithium ions. For example, it may have the form of a lithium salt that is dissolved in an organic solvent, or the form of a lithium salt that is dissolved in an ionic liquid. Here, "ionic liquid" refers to a series of compounds that is a salt consisting only of cations and anions, and that are liquid at normal temperature.

Preferred examples of organic solvents that may be employed are, for example, carbonates such as ethylene carbonate (EC), propylene carbonate (PC), dimethyl carbonate (DMC), diethyl carbonate (DEC), ethylmethylcarbonate and so on, and a mixture thereof.

Moreover, as the lithium salt that is employed by being dissolved in an organic solvent, a conventionally known electrolyte salt that is employed in a lithium ion secondary cell, such as $Li(C_2F_5SO_2)_2N$, $LiPF_6$, $LiBF_4$, $LiClO_4$, $LiAsF_6$, $LiCF_3SO_3$ or the like may be used. The concentration of the lithium salt is preferably 0.1 to 2.0 mol/L, and more preferably 0.8 to 1.2 mol/L.

Additives other than the components described above may also be included in the organic solvent. Specific examples of such additives that may be suggested are, for example, vinylene carbonate, methyl vinylene carbonate, dimethyl vinylene carbonate, phenyl vinylene carbonate, diphenyl vinylene carbonate, ethyl vinylene carbonate, diethyl vinylene carbonate, vinyl ethylene carbonate, 1,2-divinyl ethylene carbonate, 1-methyl-1-vinyl ethylene carbonate, 1-methyl-2-vinyl ethylene carbonate, 1-ethyl-1-vinyl ethylene carbonate, 1-ethyl-2-vinyl ethylene carbonate, vinyl vinylene carbonate, allyl ethylene carbonate, vinyl oxymethyl ethylene carbonate, allyl oxymethyl ethylene carbonate, acryl oxymethyl ethylene carbonate, methacryl oxymethyl ethylene carbonate, ethynyl ethylene carbonate, propargyl ethylene carbonate, ethynyl oxymethyl ethylene carbonate, propargyl oxyethylene carbonate, methylene ethylene carbonate, 1,1-dimethyl-2-methylene ethylene carbonate, or the like. Among these, vinylene carbonate, methyl vinylene carbonate and vinyl ethylene carbonate are preferred, and vinylene carbonate and vinyl ethylene carbonate are more preferred. One of these cyclic carbonates may be used alone, or two or more of them may be employed in combination.

The cation component that is a constituent of the ionic liquid is preferably at least one type selected from the group consisting of substituted or unsubstituted imidazolium ions, substituted or unsubstituted pyridinium ions, substituted or unsubstituted pyrrolium ions, substituted or unsubstituted pyrazolium ions, substituted or unsubstituted pyrrolinium ions, substituted or unsubstituted pyrrolidinium ions, substituted or unsubstituted piperidinium ions, substituted or unsubstituted triazinium ions, and substituted or unsubstituted ammonium ions.

As specific examples of the anion component constituting the ionic liquid, halide ions such as fluoride ions, chloride ions, bromide ions and iodide ions or the like, nitrate ions (NO3-), tetrafluoro borate ions (BF4-), hexafluoro phosphate ions (PF6-), (FSO2)2N—, AlCl3-, lactate ions, acetate ions (CH3COO—), trifluoroacetate ions (CF3COO—), methane sulfonate ions (CH3SO3-), trifluoromethanesulfonate ions (CF3SO3-), bis(trifluoromethanesulfonyl) imide ions ((CF3SO2)2N—), bis (pentafluoroethylsulfonyl) imide ions (C2F5SO2)2N—), tris (trifluoromethanesulfonyl) carbonate ions (CF3SO2)3C—), perchlorate ions (ClO4-), dicyanamide ions ((CN)2N—), organic sulfate ions, organic sulfonate ions, R1COO—, HOOCR1COO—, —OOCR1COO—, NH2CHR1COO— (here, R1 is a substituent, and represents an aliphatic hydrocarbon group, an alicyclic hydrocarbon group, an aromatic hydrocarbon group, an ether group, an ester group, or an acyl group, and the substituent may include a fluorine atom), or the like may be suggested.

As examples of preferred ionic liquids, 1-methyl-3-methyl imidiazolium bis (trifluoromethanesulfonyl) imide or N-methyl-N-propylpiroridium bis (trifluoromethanesulfonyl) imide may be suggested. It would be acceptable for only one of these ionic liquids to be used alone, or two or more thereof may be used in combination.

As the lithium salt that is employed by being dissolved in the ionic liquid, the same lithium salt that is employed for the organic solvent described above may be used. The concentration of the lithium salt is preferably 0.1 to 2.0 mol/L, and more preferably 0.8 to 1.2 mol/L.

Furthermore, it would also be acceptable for the ionic liquid to include an additive as listed below. By including additives, it is possible further to improve the high rate charge/discharge characteristics and the cycle characteristics. As specific examples of additives, for example, vinylene carbonate, ethylene carbonate, propylene carbonate, γ-butyrolactone, γ-valerolactone, methyl diglyme, sulfolane, trimethyl phosphate, triethyl phosphate, methoxy methyl ethyl carbonate, fluorinated ethylene carbonate, or the like may be suggested. One of these may be employed alone, or two or more may be employed in combination. When an additive is employed, the amount used, relative to the total weight of the ion conductive liquid, is preferably 0.5 to 10% by mass, and more preferably 0.5 to 5% by mass.

Binder

A conventionally known binder for a lithium secondary cell such as carboxymethylcellulose, SBR latex, polyvinylidene fluoride (PVdF), acrylic resin or the like may be suggested as the binder.

Conductive Adjuvant

"Conductive adjuvant" refers to an additive to be blended in order to improve the electrical conductivity of the positive electrode active material layer (or the negative electrode active material layer). In other words, it will be acceptable for the positive electrode active material layer (or the negative electrode active material layer) further to include a conductive adjuvant (Y) which is different from the conductive adjuvant (X) described above, and which is not fixed with any coating resin. As the conductive adjuvant (Y), substantially the same material as those mentioned for the conductive adjuvant (X) described above, i.e. carbon material such as Ketchen black, carbon black such as acetylene black, graphite, and carbon fiber and so on may be suggested. When the positive electrode active material layer (or the negative electrode active material layer) includes such a conductive adjuvant, then an electron network is effectively formed in the interior of the active material layer, and this can contribute to improvement of the output characteristics of the cell.

Ion Conductive Polymer

A conventionally known polyoxyalkylene oxide polymer such as, for example, polyethylene oxide (PEO) based or polypropylene oxide (PPO) based polymer may be suggested as the ion conductive polymer.

Negative Electrode Layer

The negative electrode layer 15 has a groove shaped gas flow passage 151. And the negative electrode layer 15 is made from negative electrode layer forming material that contains negative electrode active material and an ion conductive liquid. Moreover, the negative electrode layer 15 is non-bonded body of the negative electrode active material. It should be understood that, like the positive electrode layer, the negative electrode layer forming material may include gel forming polymer, a binder, a conductive adjuvant, and/or ion conductive polymer and so on. Furthermore, it is preferred for the viscosity of the negative electrode layer forming material to be 2.8 Pa·s or more and 7.7 Pa·s or less. Moreover, it is even more preferable for the viscosity of the negative electrode layer forming material to be 3.1 Pa·s or more and 7.1 Pa·s or less. In order to adjust the viscosity of the negative electrode layer forming material to 2.8 Pa·s or more and 7.7 Pa·s or less, it will be sufficient to adjust the ratio between the solid component or components included in the negative electrode layer (the negative electrode active material, gel forming polymer, binder, conductive adjuvant, and/or ion conductive polymer) and the ion conductive liquid. Moreover, it would also be possible to adjust the ratio between the solid component or components included in the negative electrode layer and the ion conductive liquid by the presence or absence of the gel forming polymer, binder, conductive adjuvant, and/or ion conductive polymer, and/or by the content of the negative electrode active material, gel forming polymer, binder, conductive adjuvant, and/or ion conductive polymer.

Furthermore, in the preferred example shown in the figures, the ratio of the size d1 of the gas flow passage 151 in the in-plane direction of the negative electrode layer 15 with respect to the thickness T of the negative electrode layer 15 is preferably 0.32 or less, but is not particularly limited. Moreover, the ratio of the size d1 of the gas flow passage 151 in the in-plane direction of the negative electrode layer 15 with respect to the thickness T of the negative electrode layer 15 is preferably 0.004 or more, more preferably 0.009 or more, and even more preferably 0.03 or more, but is not particularly limited.

Even further, although not shown in the figures, it is preferable for the gas flow passage in the negative electrode layer to communicate up to the outer peripheral edge of the negative electrode layer, but this is not limitative. For example, although not shown in the figures, a structure in which the gas flow passage in the negative electrode layer does not communicate with the outer peripheral edge, or a structure in which one end of the gas flow passage in the negative electrode layer communicates with the outer peripheral edge may be employed.

Even further, in the preferred example shown in the figures, the surface pressure applied in the thickness direction of the negative electrode layer 15, as indicated by the arrow Z, is preferably 68.6 kPa or more and preferably 600 kPa or less, but is not particularly limited.

Still further, in the preferred example shown in the figures, it is preferred for one or both of the size d2 of the gas flow passages 151 in the thickness direction of the negative electrode layer 15 and the size d1 of the gas flow passages 151 in the in-plane direction of the negative electrode layer 15 to be 2 μm or more, and more preferably 3 μm or more, but this is not particularly limitative.

Moreover, in the preferred example shown in the figures, the negative electrode layer 15 has gas flow passages 151, with the interval d3 between adjacent gas flow passages 151 being preferably 30 mm or less, and more preferably 15 mm or less; but this is not particularly limitative.

Yet further, although not shown in the figures, the material for the negative electrode layer preferably includes resin such as gel forming polymer or a binder or the like, and it is preferable for the content of this resin in the material for the negative electrode layer to be 1% by mass or less or for no such resin to be included; but this is not particularly limitative.

Regarding the negative electrode layer, apart from the type of the negative electrode active material, fundamentally the details are the same as those described in connection with the section "Positive Electrode Active Material", and accordingly description thereof will here be omitted. In other words, for the negative electrode active material, it is preferable to employ a negative electrode active material whose surface is coated with resin, or a negative electrode active material whose surface is coated with resin that includes a conductive adjuvant.

For example, carbon material such as graphite, soft carbon or hard carbon, lithium-transition metal complex oxide (for example Li4Ti5O12), metal material, lithium alloy based negative electrode material, or the like may be suggested for the negative electrode active material. In some cases, it would also be acceptable to employ two or more types of negative electrode active material in combination. Preferably, from the standpoint of capacity and output characteristics, carbon material or lithium-transition metal complex oxide is employed as the negative electrode active material. It is a matter of course that other negative electrode active material than those listed above may be employed.

Furthermore, in particular, the coating resin has the property of easily adhering to carbon material. Due to this, and also from the standpoint of providing structurally stable electrode material, it is preferable to employ a carbon material as the negative electrode active material. With this type of structure, structurally more stable electrode material can be provided, since the coating resin becomes capable of easily adhering to the surface of the negative electrode active material.

The average particle diameter of the negative electrode active material is not particularly limited. However, from the standpoint of higher cell output, it should preferably be 1 to 100 μm, and more preferably 1 to 20 μm.

Figure 5:
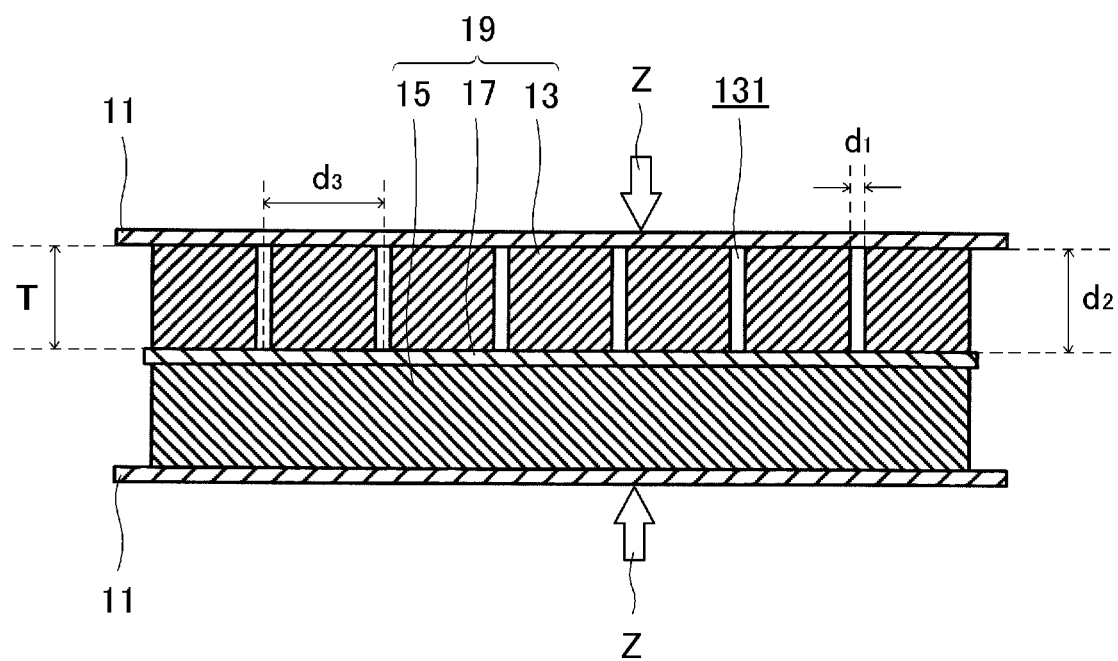
FIG. 5 is a schematic sectional view showing another example of a single cell layer of the secondary cell shown in FIG. 2.
Figure 6:
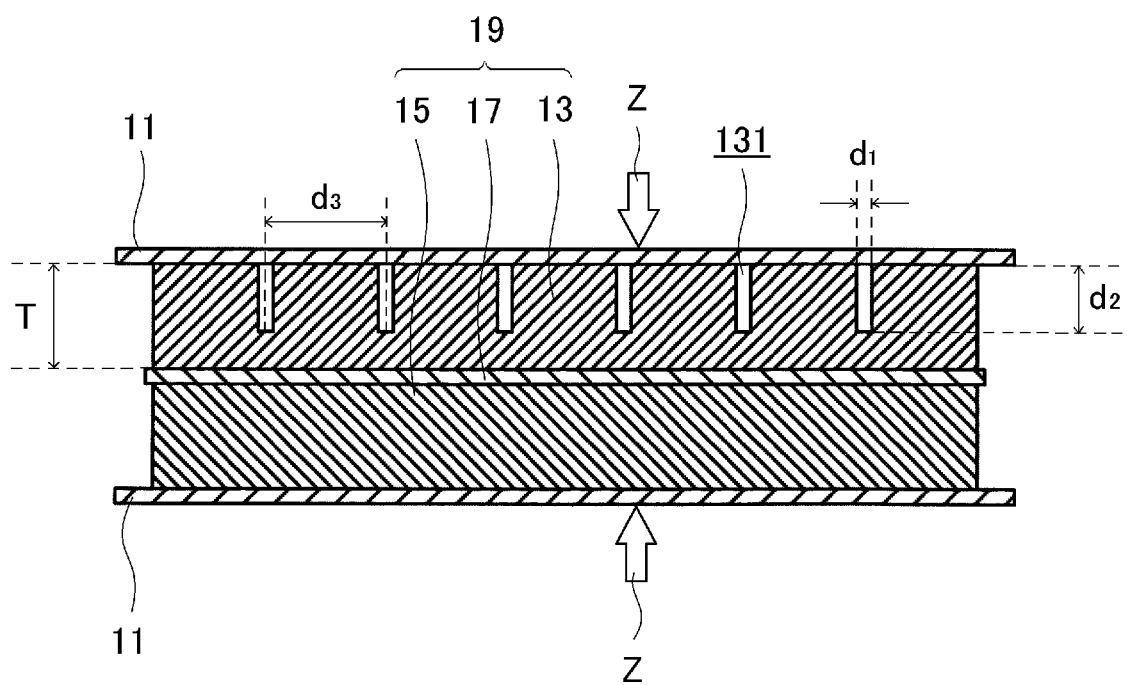
FIG. 6 is a schematic sectional view showing yet another example of a single cell layer of the secondary cell shown in FIG. 2.
Figure 7:
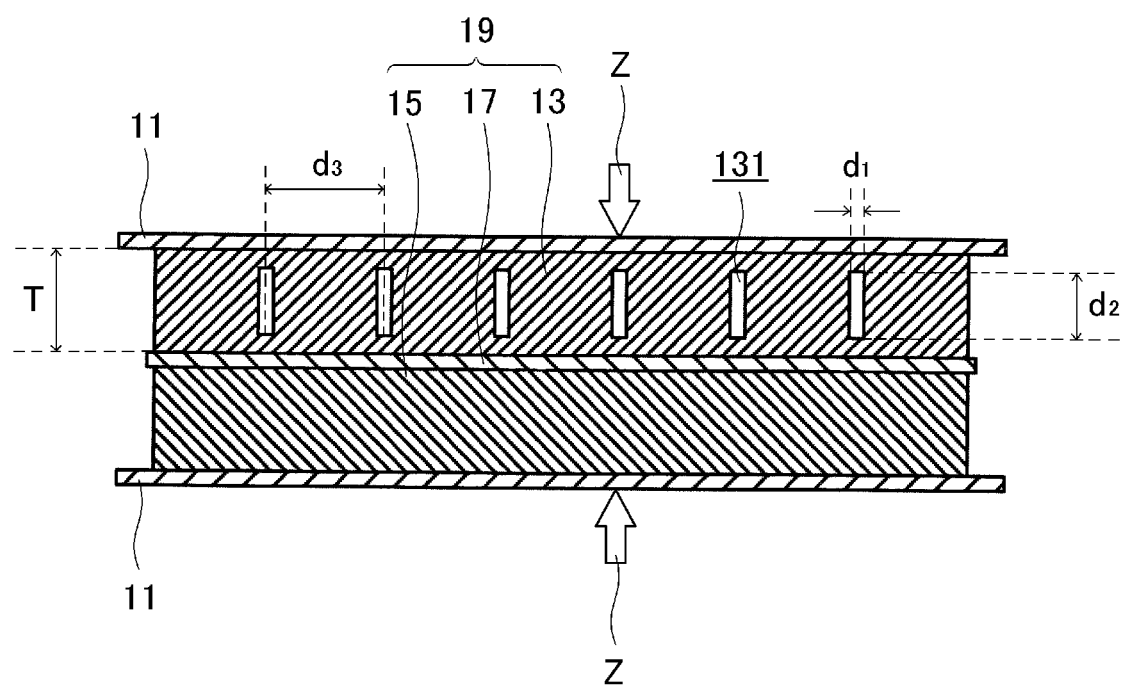
FIG. 7 is a schematic sectional view showing yet another example of a single cell layer of the secondary cell shown in FIG. 2.
Figure 8:
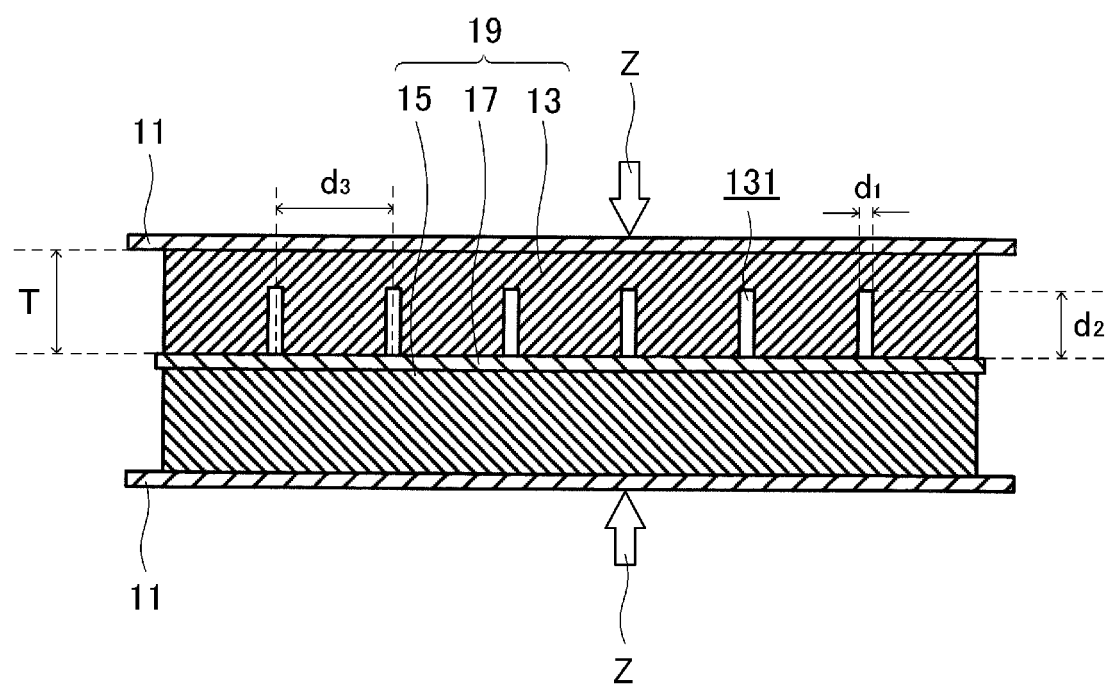
FIG. 8 is a schematic sectional view showing yet another example of a single cell layer of the secondary cell shown in FIG. 2.
Figure 9:
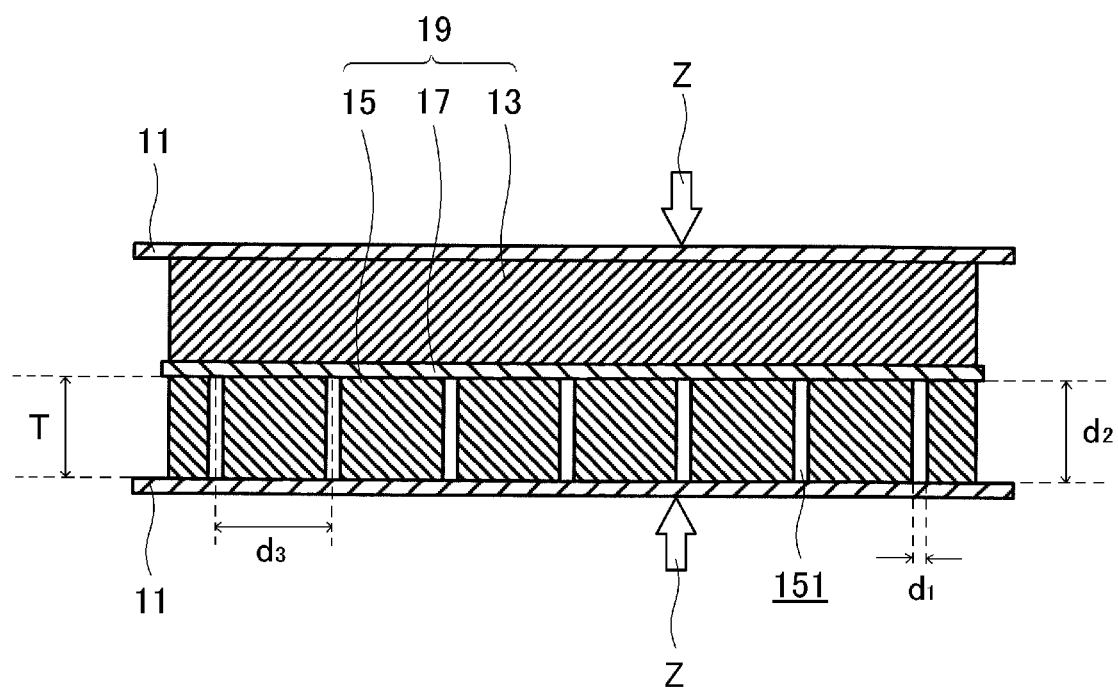
FIG. 9 is a schematic sectional view showing yet another example of a single cell layer of the secondary cell shown in FIG. 2.
Figure 10:
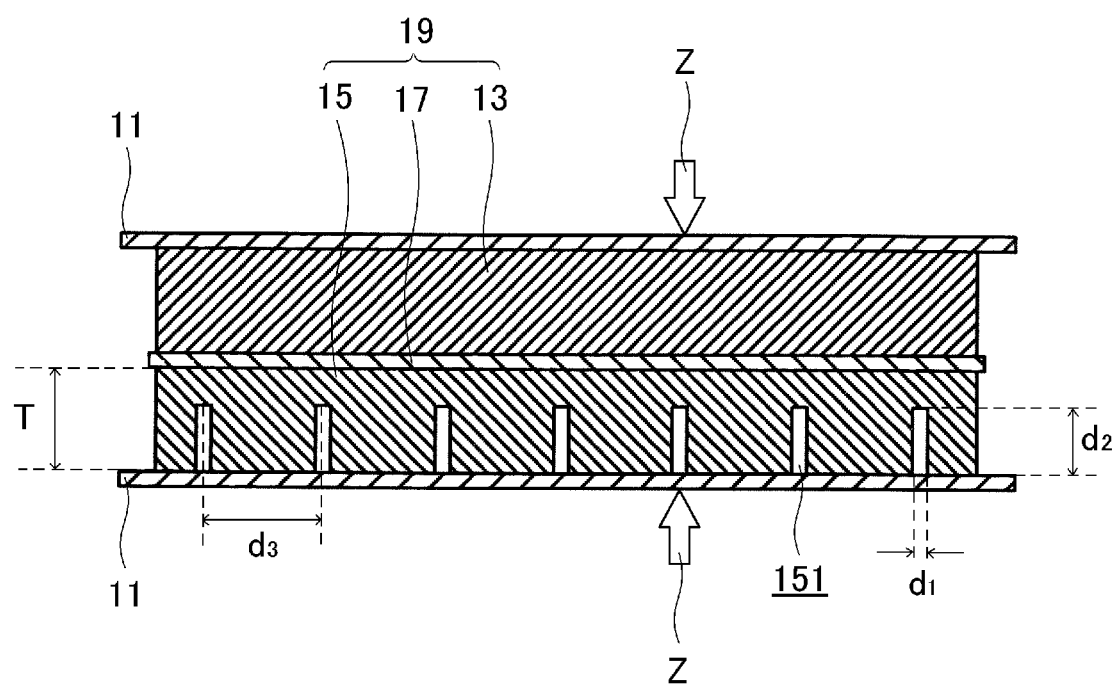
FIG. 10 is a schematic sectional view showing yet another example of a single cell layer of the secondary cell shown in FIG. 2.
Figure 11:
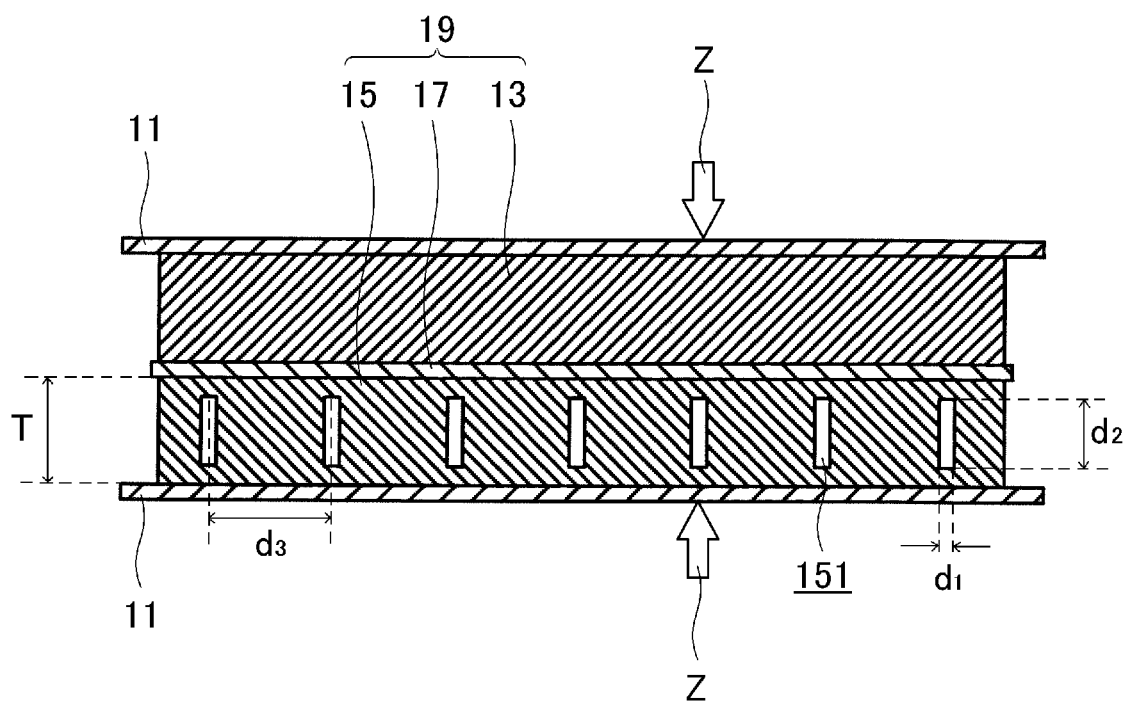
FIG. 11 is a schematic sectional view showing yet another example of a single cell layer of the secondary cell shown in FIG. 2.
Figure 12:
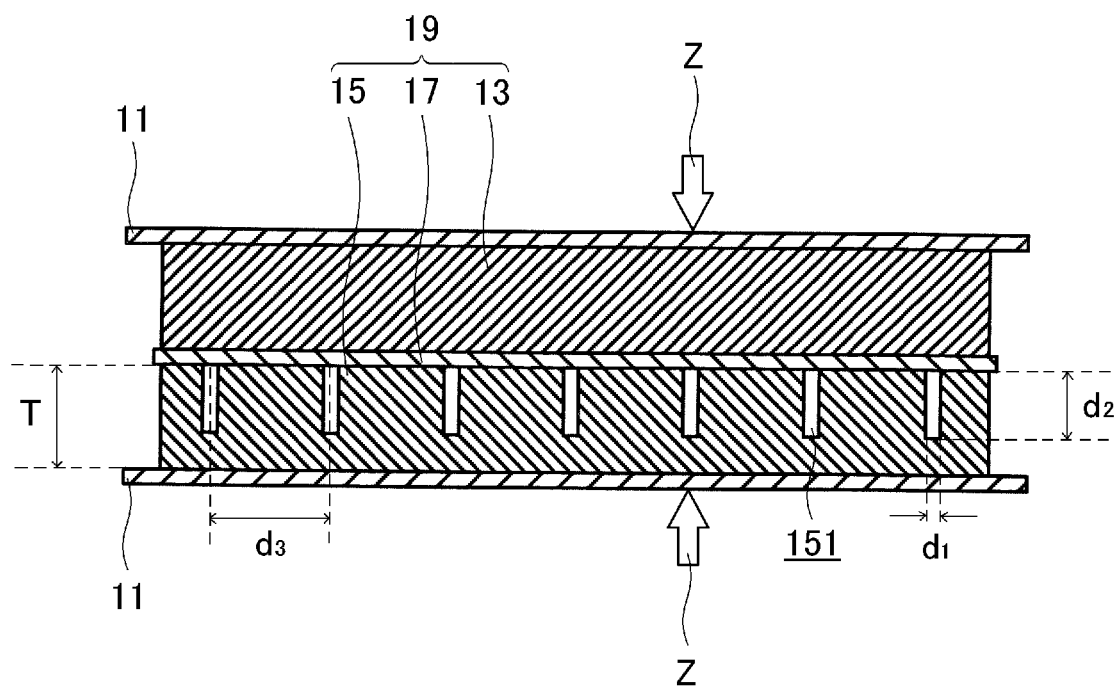
FIG. 12 is a schematic sectional view showing yet another example of a single cell layer of the secondary cell shown in FIG. 2.
Figure 13:
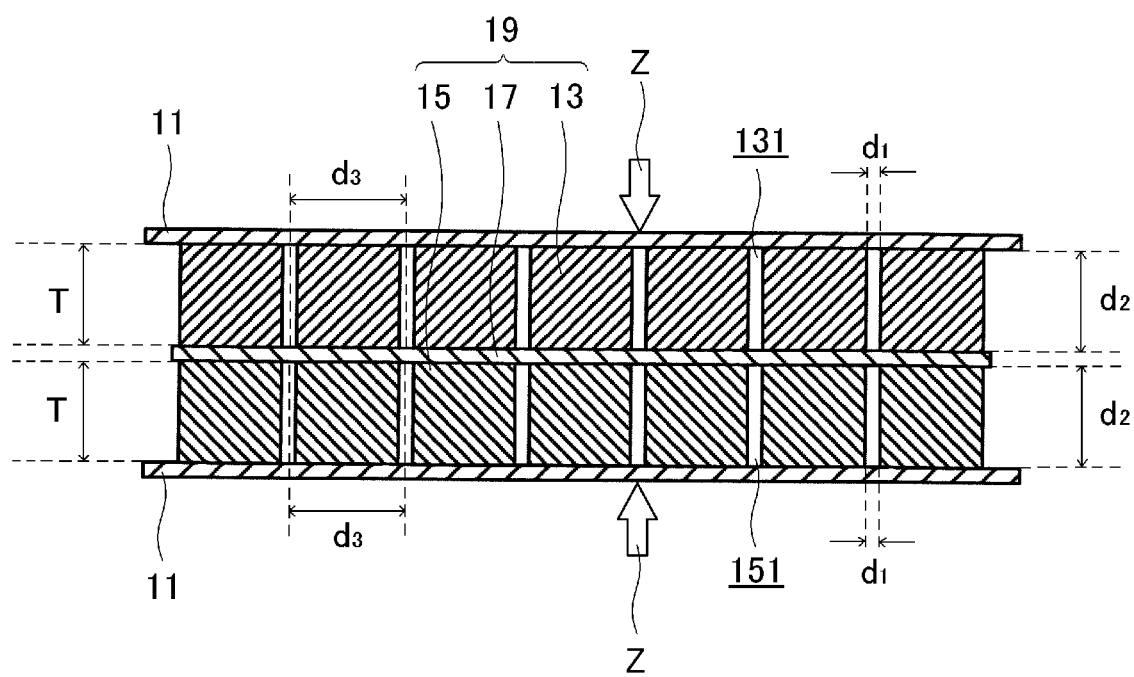
FIG. 13 is a schematic sectional view showing yet another example of a single cell layer of the secondary cell shown in FIG. 2.

Variants of the positive electrode layer 13 and the negative electrode layer 15 will now be explained in detail with reference to drawings showing single cell layer 19. FIG. 5 is a schematic sectional view showing another example of a single cell layer of the secondary cell shown in FIG. 2. Moreover, FIG. 6 is a schematic sectional view showing yet another example of a single cell layer of the secondary cell shown in FIG. 2. And FIG. 7 is a schematic sectional view showing still another example of a single cell layer of the secondary cell shown in FIG. 2. Furthermore, FIG. 8 is a schematic sectional view showing even another example of a single cell layer of the secondary cell shown in FIG. 2. Still further, FIG. 9 is a schematic sectional view showing yet another example of a single cell layer of the secondary cell shown in FIG. 2. Moreover, FIG. 10 is a schematic sectional view showing a further example of a single cell layer of the secondary cell shown in FIG. 2. And FIG. 11 is a schematic sectional view showing a yet further example of a single cell layer of the secondary cell shown in FIG. 2. Furthermore, FIG. 12 is a schematic sectional view showing still a further example of a single cell layer of the secondary cell shown in FIG. 2. Finally, FIG. 13 is a schematic sectional view showing even yet another example of a single cell layer of the secondary cell shown in FIG. 2. It should be understood that the current collectors 11 are added to the single cell layer 19 shown in FIGS. 5 to 13.

In FIG. 4, the case, in which both the positive electrode layer 13 and the negative electrode layer 15 constituting the single cell layer 19 are made from electrode layer forming material including electrode active material and ion conductive liquid and they have predetermined gas flow passages 131, 151, and they are non-bonded body, is shown. However, the present invention is not limited thereto. For example, as shown in FIGS. 5 to 12, it will be sufficient for either one of the positive electrode layer 13 and the negative electrode layer 15 constituting the single cell layer 19 to be made from electrode layer forming material containing electrode active material and ion conductive liquid, to have predetermined gas flow passages 131, 151, and to be non-bonded body. Furthermore, the gas flow passages 131, 151 may be disposed at any position with respect to the thickness direction of the electrode layers, such as the positive electrode layer or the negative electrode layer. In other words, in the thickness direction of the electrode layer, the gas flow passages 131, 151 may have groove shapes that communicate with either one or both of the electrolyte layer 17 and the current collector 11; or, alternatively, the gas flow passages 131, 151 may have tubular shapes that communicate with neither the electrolyte layer 17 nor the current collector 11.

Moreover, in FIG. 4, the case is shown, in which the arrangement of the gas flow passages 131 in the in-plain direction of the positive electrode layer 13 of the gas flow passages 131 in the positive electrode layer 13 constituting the single cell layer 19 and the arrangement of the gas flow passages 151 in the in-plain direction of the negative electrode layer 15 of the gas flow passages 151 in the negative electrode layer 15 constituting the single cell layer 19 are shifted. However, the present invention is not limited thereto. For example, as shown in FIG. 13, the arrangement of the gas flow passages 131 in the in-plain direction of the positive electrode layer 13 of the gas flow passages 131 in the positive electrode layer 13 constituting the single cell layer 19 and the arrangement of the gas flow passages 151 in the in-plain direction of the negative electrode layer 15 of the gas flow passages 151 in the negative electrode layer 15 constituting the single cell layer 19 may be overlapped.

Electrolyte Layer

The electrolyte that is employed in the electrolyte layer 17 is not particularly limited; a liquid electrolyte, a gel polymer electrolyte, or an ionic liquid electrolyte may be employed.

The liquid electrolyte has the function of acting as a carrier of lithium ions. The liquid electrolyte that constitutes the electrolyte layer has the form, in which a lithium salt is dissolved in an organic solvent. Preferred examples of organic solvents that may be employed are carbonates such as ethylene carbonate (EC), propylene carbonate (PC), dimethyl carbonate (DMC), diethyl carbonate (DEC), ethyl methyl carbonate, and a mixture thereof. Moreover, as the lithium salt that is dissolved in the organic solvent, a conventionally known electrolyte salt for a lithium ion secondary cell, such as Li(C2F5SO2)2N, LiPF6, LiBF4, LiClO4, LiAsF6, or LiCF3SO3 may be employed. Apart from the components described above, the liquid electrolyte may also include other additives. Specific examples of such additives that may be suggested are, for example, vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, 1,1-dimethyl-2-methylene ethylene carbonate, or the like. Among these, vinylene carbonate, methylvinylene carbonate and vinylethylene carbonate are preferred, and vinylene carbonate and vinylethylene carbonate are more preferred. One of these cyclic carbonates may be used alone, or two or more of them may be employed in combination.

A gel polymer electrolyte has a structure in which a liquid electrolyte as described above is injected into a matrix polymer (i.e. a host polymer) that is made from ion conductive polymer. The employment of a gel polymer electrolyte as the electrolyte eliminates the fluidity of the electrolyte, and this is excellent from the standpoint that it makes it easy to intercept ion conductivity between the layers. As the ion conductive polymer that is employed as the matrix polymer (i.e. as the host polymer), for example, polyethylene oxide (PEO), polypropylene oxide (PPO), polyethylene glycol (PEG), polyacrylonitrile (PAN), polyvinylidene fluoride-hexafluoro propylene (PVdF-HEP), polymethylmethacrylate (PMMA), or a copolymer thereof may be suggested.

A matrix polymer for a gel polymer electrolyte is able to develop excellent mechanical strength by forming a cross-linked structure. In order to form such a cross-linked structure, polymerized polymer (for example, PEO or PPO) for forming the polymer electrolyte is subjected to polymerization processing, such as thermal polymerization, ultraviolet polymerization, radiation polymerization, or electron beam polymerization by using an appropriate polymerization initiator.

An ionic liquid electrolyte is a solution of a lithium salt dissolved in an ionic liquid. Here, "ionic liquid" refers to a series of compounds that is a salt consisting only of cations and anions, and that are liquid at normal temperature.

The cation component of the ionic liquid is preferably at least one type selected from the group consisting of substituted or unsubstituted imidazolium ions, substituted or unsubstituted pyridinium ions, substituted or unsubstituted pyrrolium ions, substituted or unsubstituted pyrazolium ions, substituted or unsubstituted pyrrolinium ions, substituted or unsubstituted pyrrolidinium ions, substituted or unsubstituted piperidinium ions, substituted or unsubstituted triazinium ions, and substituted or unsubstituted ammonium ions.

As specific examples of the anion component of the ionic liquid, halide ions such as fluoride ions, chloride ions, bromide ions and iodide ions, nitrate ions (NO3-), tetrafluoro borate ions (BF4-), hexafluoro phosphate ions (PF6-), (FSO2)2N—, AlCl3-, lactate ions, acetate ions (CH3COO—), trifluoroacetate ions (CF3COO—), methanesulfonate ions (CH3SO3-), trifluoromethanesulfonate ions (CF3SO3-), bis(trifluoromethanesulfonyl) imidate ions ((CF3SO2)2N—), bis(pentafluoroethylsulfonyl) imide ions (C2F5SO2)2N—), tris(trifluoromethanesulfonyl) carbonate ions (CF3SO2)3C—), perchlorate ions (ClO4-), dicyanamide ions ((CN)2N—), organic sulfate ions, organic sulfonate ions, R1COO—, HOOCR1COO—, —OOCR1COO—, and NH2CHR1COO— (here, R1 is a substituent, and represents an aliphatic hydrocarbon group, an alicyclic hydrocarbon group, an aromatic hydrocarbon group, an ether group, an ester group, or an acyl group, and the substituent may include a fluorine atom) or the like may be suggested.

As examples of preferred ionic liquids, 1-methyl-3-methylimidiazolium bis(trifluoromethanesulfonyl) imide or N-methyl-N-propylpiroridium bis(trifluoromethanesulfonyl) imide may be suggested. It would be acceptable for only one of these ionic liquids to be used alone, or for two or more thereof to be used in combination.

As the lithium salt that is employed by being dissolved in the ionic liquid electrolyte, the same lithium salt that is employed in the liquid electrolyte described above may be used. The concentration of that lithium salt is preferably 0.1 to 2.0 mol/L, and more preferably 0.8 to 1.2 mol/L.

Furthermore, it would also be acceptable for the ionic liquid to include an additive as listed below. By including additives, it is possible further to improve the high rate charge/discharge characteristics and the cycle characteristics. As specific examples of the additives, for example, vinylene carbonate, ethylene carbonate, propylene carbonate, γ-butyrolactone, γ-valerolactone, methyl diglyme, sulfolane, trimethyl phosphate, triethyl phosphate, methoxy methyl ethyl carbonate, fluorinated ethylene carbonate, or the like may be suggested. One of these may be employed alone, or two or more may be employed in combination. When an additive is employed, the amount used, relative to the total weight of the ionic liquid electrolyte, is preferably 0.5 to 10% by mass, and more preferably 0.5 to 5% by mass.

In the case of a bipolar type lithium ion secondary cell, it would also be possible to employ a separator in the electrolyte layer. Such a separator has the function of ensuring lithium ion conductivity between the positive electrode and the negative electrode by retaining the electrolyte, and also has the function of serving as a dividing wall between the positive electrode and the negative electrode. It is particularly preferable to use a separator when a liquid electrolyte or an ionic liquid electrolyte is employed as the electrolyte.

For the form of the separator, for example, a separator made as a porous sheet from a polymer or a fiber that can absorb and retain the above described electrolyte, or a non-woven fabric separator or the like may be suggested.

As a separator made as a porous sheet from a polymer or a fiber, for example, a micro-porous material (i.e. a micro-porous membrane) that is used as a separator in a conventionally known type of lithium ion secondary cell may be employed. As the specific form of the porous sheet made from such a polymer or fiber, for example, a micro-porous material (i.e. a micro-porous membrane) separator made from a polyolefin such as polyethylene (PE) or polypropylene (PP) or the like, or a laminated body in which two or more such material are laminated together (for example, a laminated body with a three-layered structure, such as PP/PE/PP or the like), or a hydrocarbon based resin such as polyimide, aramid, polyvinylidene fluoride-hexafluoro propylene (PVdF-HFP) or the like, or glass fiber, may be employed.

As for the thickness of the micro-porous material (a micro-porous membrane) separator, this cannot be stipulated unequivocally, because it varies according to the application in which the cell is to be employed. As one example, in an application such as a secondary cell for driving an electric motor for an electric automobile (EV), a hybrid electric automobile (HEV), a fuel cell automobile (FCV), or the like, a single-layer or multi-layer separator having thickness of 4 to 60 μm is preferred. Moreover, it is desirable for the diameter of the micro pores of the above mentioned microporous material (a micro-porous membrane) separator to be a maximum of 1 μm or less (typically, the micro pores have a diameter of several tens of nm, approximately).

For a non-woven fabric separator, a conventionally known material such as cotton, rayon, acetate, nylon, polyester, a polyolefin such as PP or PE or the like, a polyimide, an aramid, or the like may be employed alone, or in a mixture. Moreover, the bulk density of such a non-woven fabric is not particularly limited, so long as sufficient cell characteristics can be obtained with an impregnated polymer gel electrolyte. Furthermore, it is sufficient if the thickness of such a non-woven fabric separator is the same as that of the electrolyte layer, and is preferably 5 to 200 μm, and more preferably 10 to 100 μm.

Yet further, it is preferable for the separator to be a separator in which a heat resistant insulating layer is laminated upon a porous substrate (i.e. a separator with a heat resistant insulating layer). Such a heat resistant insulating layer is a ceramic layer that includes inorganic particles and a binder. It is preferable for the material employed for this separator with a heat resistant insulating layer to be a high heat resistant material with a melting point or a heat softening point of 150° C. or more, and more preferably 200° C. or more. By providing such a heat resistant insulating layer, it is possible to obtain the effect of suppressing thermal shrinkage, because internal stresses in the separator, which increase when the temperature rises, are mitigated. Since, as a result, it is possible to prevent short circuiting between the electrodes of the cell from being caused, accordingly a cell structure is obtained in which deterioration of the performance due to temperature rise is less likely to occur. Moreover, due to the provision of such a heat resistant insulating layer, the mechanical strength of this separator with heat resistant insulating layer is enhanced, and it is less likely for layer separation of the separator to occur. Yet further, due to the effects of suppression of thermal shrinkage and increase of the mechanical strength, it is less likely for curling of the separator during the process of manufacturing the cell to occur.

The inorganic particles in the heat resistant insulating layer contribute to the effect of suppressing thermal shrinkage and to the mechanical strength of the heat resistant insulating layer. The material for these inorganic particles is not particularly limited. For example, silicon, aluminum, zirconium, or titanium oxide, ($SiO_2$, $Al_2O_3$, $ZrO_2$, or $TiO_2$), or a hydroxide, a nitride, or a complex thereof may be suggested. These inorganic particles may be derived from mineral resources such as boehmite, zeolite, apatite, kaolin, mullite, spinel, olivine, mica, or the like, or may be prepared artificially. Moreover, it would be acceptable for a single type of these inorganic particles to be employed alone, or alternatively for two or more types to be employed in combination. Among these, from the standpoint of cost, it is preferable to employ silica ($SiO_2$) or alumina ($Al_2O_3$), and it is more preferable to employ alumina ($Al_2O_3$).

The mass per unit area of the heat resistant particles is not particularly limited. However it is preferably 5 to 15 g/m2. Within this range, sufficient ion conductivity can be obtained, and moreover this range is preferred from the standpoint of maintaining the heat resistance strength.

The binder in the heat resistant insulating layer has the role of adhering the inorganic particles together, and of adhering the inorganic particles to the porous resin substrate layer. Due to this binder, the heat resistant insulating layer is formed in a stable manner, and also delamination between the porous substrate layer and the heat resistant insulating layer is prevented.

The binder that is employed for the heat resistant insulating layer is not particularly limited, and for example, compound such as carboxymethyl cellulose (CMC), polyacrylonitrile, cellulose, ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), methyl acrylate or the like may be employed as the binder. Among these, carboxymethyl cellulose (CMC), methyl acrylate, and polyvinylidene fluoride (PVDF) are preferred. One of these compounds may be used alone, or, alternatively, two or more of them may be used in combination.

The content of the binder in the heat resistant insulating layer is preferably 2 to 20% by mass. When the content of the binder is 2% by mass or more, then it is possible to enhance the detachment strength between the heat resistant insulating layer and the porous substrate layer, so that it is possible to enhance the vibration resistance of the separator. On the other hand, when the content of the binder is 20% by mass or less, then it is possible to ensure sufficient lithium ion conductivity, since it is possible to keep the gaps between the inorganic particles at appropriate levels.

It is preferred for the thermal shrinkage ratio of this separator with heat resistant insulating layer to be 10% or less with respect to both MD and TD, after being held for one hour under a condition of 150° C. and 2 gf/cm2. By employing a material having this type of high heat resistance, it is possible to effectively prevent shrinkage of the separator, even if the amount of heat generated at the positive electrode becomes high and the internal temperature of the cell reaches 150° C. As a result, a cell structure is obtained in which reduction of the performance due to elevation of the temperature cannot easily occur, since it is possible to prevent short circuiting between the electrodes of the cell being caused.

Positive Current Collection Plate and Negative Current Collection Plate

The material constituting the current collector plates (25, 27) is not particularly limited, and any conventionally known highly electrically conductive material that is conventionally employed as a current collector plate for a lithium ion secondary cell may be used. As the material constituting the current collector plate, metal material such as, for example, aluminum, copper, titanium, nickel, stainless steel (SUS), or an alloy thereof is preferred. From the standpoints of light weight, corrosion resistance, and high electrical conductivity, aluminum or copper are more preferable, and in particular aluminum is preferred. It should be understood that it would be acceptable for the same material to be employed for both the positive electrode current collection plate 27 and the negative electrode current collection plate 25; or different materials could also be used.

Sealing Part

The sealing part 29 has the function of preventing contacting between the current collectors and preventing short circuiting at the end portions of the single cell layers. As the material constituting the sealing portion, any material may be employed, so long as it is a good insulator, has good sealing performance against falling off of the solid electrolyte and good sealing performance (sealing characteristics) against penetration of moisture from the outside, has good heat resistance at the operating temperature of the cell, and so on. For example, acrylic resin, urethane resin, epoxy resin, polyethylene resin, polypropylene resin, polyimide resin, rubber (ethylene-propylene-diene rubber: EPDM) or the like may be employed. Moreover, it would also be acceptable to employ an isocyanate based adhesive, an acrylic resin based adhesive, a cyanoacrylate based adhesive, or the like, or a hot melt adhesive (urethane resin, polyamide resin, or polyolefin resin) or the like. Among these, from the standpoints of corrosion resistance, chemical resistance, ease of manufacture (film forming property), economic efficiency, and so on, polyethylene resin or polypropylene resin is preferably employed as the material constituting the insulating layer, and it is more preferable to employ a resin whose main component is a non-crystalline polypropylene resin and in which ethylene, propylene, and/or butane are copolymerized.

Outer Casing

For the outer casing 31, for example, a casing made from a laminated film including aluminum may be employed. Specifically, while a laminated film including aluminum having a three-layered structure in which, for example, PP, aluminum, and nylon are laminated together in that order or the like may be employed, this is not to be considered as being limitative in any way. Moreover, it would also be acceptable to use a conventionally known casing made from metal can as the outer casing. A laminated film is preferred, from the standpoint that it is excellent in higher output and cooling performance, and that it can be employed in an appropriate manner for a cell for large sized equipment such as an EV or an HEV. Furthermore, an aluminate laminate is more preferred for the outer casing, since it is easy to adjust the group pressure applied to the power generation element from the exterior, and also it can be easily adjusted to the desired thickness of the electrolyte layer.

EXAMPLES

In the following, the present invention will be explained in detail with reference to Examples thereof. However, the present invention should not be considered as being limited to those Examples.

Example 1 to Example 11

Preparation of the Positive Electrode Slurry

A powder material was prepared by drying 93.9 parts by mass of lithium-nickel-cobalt-aluminum complex oxide, 0.3 parts by mass of acrylic resin, 5.8 parts by mass of acetylene black, and 2.0 parts by mass of carbon fiber under reduced pressure at 120° C. for 16 hours, so as to remove moisture.

A mixture was manufactured by adding 47 parts by mass of an electrolyte solution obtained by dissolving 1.0 mol/L of lithium hexafluorophosphate (LiPF6) in a mixed solvent of 50% by mass of ethylene carbonate (EC) and 50% by mass of propylene carbonate (PC), to 100 parts by mass of the powder material obtained as described above.

Then a positive electrode slurry was prepared by mixing the mixture thus obtained for 120 seconds at a rotation speed of 2000 rpm with a mixing deaerator (ARE250, manufactured by Thinky Co. Ltd.).

Preparation of the Negative Electrode Slurry

A powder material was prepared by drying 88.4 parts by mass of hard carbon, 10 parts by mass of acrylic resin, 1.6 parts by mass of acetylene black, and 2.0 parts by mass of carbon fiber under reduced pressure at 120° C. for 16 hours, so as to remove moisture.

A mixture was manufactured by adding 90 parts by mass of an electrolyte solution obtained by dissolving 1.0 mol/L of lithium hexafluorophosphate (LiPF6) in a mixed solvent of 50% by mass of ethylene carbonate (EC) and 50% by mass of propylene carbonate (PC), to 100 parts by mass of the powder material obtained as described above.

Then a negative electrode slurry was prepared by mixing the mixture thus obtained for 120 seconds at a rotation speed of 2000 rpm with a mixing deaerator (ARE250, manufactured by Thinky Co. Ltd.).

Here, a resin manufactured as follows was employed as the acrylic resin in each example.

83 parts by mass of ethyl acetate and 17 parts by mass of methanol were charged into a four-necked flask equipped with a stirrer, a thermometer, a reflux cooling tube, a dropping funnel, and a nitrogen gas inlet tube, and the temperature was raised to 68° C. Next, a blended monomer solution containing 242.8 parts by mass of methacrylic acid, 97.1 parts by mass of methyl methacrylate, 242.8 parts by mass of 2-ethylhexyl methacrylate, 52.1 parts by mass of ethyl acetate, and 10.7 parts by mass of methanol blended together, and an initiator solution obtained by dissolving 0.263 parts by mass of 2,2'-azobis (2,4-dimethyl valeronitrile) in 34.2 parts by mass of ethyl acetate, were continuously added dropwise over four hours under stirring with a dropping funnel, while introducing nitrogen into the four-necked flask by blowing. Radical polymerization was thus performed. After completion of the dripping, an initiator solution obtained by dissolving 0.583 parts by mass of 2,2'-azobis (2,4-dimethyl valeronitrile) in 26 parts by mass of ethyl acetate was continuously added over two hours by using a dropping funnel. Furthermore, polymerization was continued for four hours at the boiling point. Then after eliminating the solvent and having obtained 582 parts by mass of resin, 1,360 parts by mass of isopropanol was added to obtain a copolymer solution having a resin concentration of 30% by mass. The number average molecular weight of the copolymer was 100,000 as measured by GPC, and the SP value was 11.2.

Preparation of Positive Electrode

The positive electrode slurry thus obtained was applied upon a carbon coated aluminum foil (C thickness 1 μm, Al thickness 20 μm, manufactured by Showa Denko Co. Ltd.) by using a screen plate having a predetermined size and interval of a gas flow passage, while controlling the amount applied. After the positive electrode slurry was applied, an aramid sheet (45 μm, manufactured by Nippon Vilene Co. Ltd.) was placed upon the surface of the electrode sheet and pressed, so as to obtain a positive electrode (29×40 mm). The formation of a gas flow passage was confirmed by visual inspection, and by observation with a scanning electron microscope. The mass per unit area of the positive electrode in terms of lithium-nickel-cobalt-aluminum complex oxide is 50 mg/cm2. And the theoretical capacity of this positive electrode (in mAh/cm2) was calculated by multiplying the theoretical charging capacity (in mAh/g) of the positive electrode active material that was used by the above positive electrode mass per unit area (in mg/cm2).

Preparation of Negative Electrode

The negative electrode slurry thus obtained was applied upon a copper foil (thickness 10 μm, manufactured by Thank Metal Co. Ltd.) by using a screen plate having a predetermined size and interval of a gas flow passage, while controlling the amount applied. After the negative electrode slurry was applied, an aramid sheet (45 μm, manufactured by Nippon Vilene Co. Ltd.) was placed upon the surface of the electrode sheet and pressed, so as to obtain a negative electrode (33×44 mm). The formation of a gas flow passage was confirmed by visual inspection, and by observation with a scanning electron microscope. The theoretical capacity of this negative electrode (in mAh/cm2) was calculated by multiplying the theoretical charging capacity (in mAh/g) of each material that was used by the above negative electrode mass per unit area (in mg/cm2).

Manufacture of Secondary Cell

For each example, a lithium ion secondary cell was manufactured by selecting both a negative electrode and a positive electrode obtained as described above so as to obtain a desired A/C ratio, in other words a desired ratio for the theoretical negative electrode capacity to the theoretical positive electrode capacity, by sandwiching a separator (#3501, thickness 25 μm, manufactured by Celgard Co. Ltd.) between the negative electrode and the positive electrode, by adding a suitable amount of the electrolyte solution described above as necessary, and by housing the assembly by vacuum sealing within an outer casing made from laminated aluminum sheet. It should be understood that the formation of the gas flow passage in the cell state was confirmed by observation by X-ray CT (and the same hereinafter). Moreover, the viscosity of the positive electrode layer forming material and of the negative electrode layer forming material was measured by employing a rotation viscometer at 25° C., and the value of 46.4 s-1 was taken as an index (and the same hereinafter). Further, in relation to the various sizes and thicknesses, after having frozen the electrode layers according to requirements, they were measured by observation of cross sections of the positive electrode layer and the negative electrode layer with a scanning electron microscope (and the same hereinafter).

All of these processes from preparation of the slurry to manufacture of the cell were carried out in a dry room.

Comparative Example 1

Preparation of Positive Electrode Slurry

A powder material was prepared by drying 93.9 parts by mass of lithium-nickel-cobalt-aluminum complex oxide, 0.3 parts by mass of acrylic resin, 5.8 parts by mass of acetylene black, and 2.0 parts by mass of carbon fiber, which are used in each of the above examples, under reduced pressure at 120° C. for 16 hours, so as to remove moisture.

A mixture was prepared by adding 47 parts by mass of an electrolyte solution obtained by dissolving 1.0 mol/L of lithium hexafluorophosphate (LiPF6) in a mixed solvent of 50% by mass of ethylene carbonate (EC) and 50% by mass of propylene carbonate (PC), to 100 parts by mass of the powder material obtained as described above.

Positive electrode slurry was prepared by mixing the mixture thus obtained for 120 seconds at a rotation speed of 2000 rpm with a mixing deaerator (ARE250, manufactured by Thinky Co.)

Preparation of Negative Electrode Slurry

A powder material was prepared by drying 88.4 parts by mass of hard carbon, 10 parts by mass of acrylic resin, 1.6 parts per weight of acetylene black, and 2.0 parts by mass of carbon fiber, which are used in each of the above examples, under reduced pressure at 120° C. for 16 hours, so as to remove moisture.

A mixture was prepared by adding 90 parts by mass of an electrolyte solution obtained by dissolving 1.0 mol/L of lithium hexafluorophosphate (LiPF6) in a mixed solvent of 50% by mass of ethylene carbonate (EC) and 50% by mass of propylene carbonate (PC), to 100 parts by mass of the powder material obtained as described above.

A negative electrode slurry was prepared by mixing the mixture thus obtained for 120 seconds at a rotation speed of 2000 rpm with a mixing deaerator (ARE250, manufactured by Thinky Co. Ltd.).

Preparation of Positive Electrode

The positive electrode slurry thus obtained was applied upon a carbon coated aluminum foil (C thickness 1 μm, Al thickness 20 μm, manufactured by Showa Denko Co. Ltd.) by using a self-propelled type coater, while controlling the amount applied. After the positive electrode slurry was applied, an aramid sheet (45 μm, manufactured by Nippon Vilene Co. Ltd.) was placed upon the surface of the electrode sheet and pressed, so as to obtain a positive electrode (29×40 mm) with no gas flow passage formed therein. The mass per unit area of the positive electrode in terms of lithium-nickel-cobalt-aluminum complex oxide is 50 mg/cm2. The theoretical capacity of this positive electrode (in mAh/cm2) was calculated by multiplying the theoretical charging capacity (in mAh/g) of the positive electrode active material that was used by the above positive electrode mass per unit area (in mg/cm2).

Preparation of Negative Electrode

The negative electrode slurry thus obtained was applied upon a copper foil (thickness 10 μm, manufactured by Thank Metal Co. Ltd.) by using a self-propelled type coater, while controlling the amount applied. After the negative electrode slurry was applied, an aramid sheet (45 μm, manufactured by Nippon Vilene Co. Ltd.) was placed upon the surface of the electrode sheet and pressed, so as to obtain a negative electrode (33×44 mm) with no gas flow passage formed therein. The theoretical capacity of this negative electrode (in mAh/cm2) was calculated by multiplying the theoretical charging capacity (in mAh/g) of each material that was used by the negative electrode mass per unit area (in mg/cm2).

Manufacture of Secondary Cell

The lithium ion secondary cell of this Example was manufactured by selecting both a negative electrode and a positive electrode obtained as described above so as to obtain a desired A/C ratio, in other words a desired ratio for the theoretical negative electrode capacity to the theoretical positive electrode capacity, by sandwiching a separator (#3501, thickness 25 μm, manufactured by Celgard Co. Ltd.) between the negative electrode and the positive electrode, by adding a suitable amount of the electrolyte solution described above as necessary, and by housing the assembly by vacuum sealing within an outer casing made from laminated aluminum sheet. The internal structure of the electrodes in the cell state was confirmed by observation by X-ray CT. All of these processes from preparation of the slurry to manufacture of the cell were carried out in a dry room.

A part of the specification of each example is shown in Table 1.

TABLE 1

| | Gas flow passage | | Viscosity of forming material (Pa·s) | Size (d1)/ thickness (T) (—) |
|---|---|---|---|---|
| | Provided or not | Shape | | |
| *Positive Electrode Layer* | | | | |
| E.1 | Provided | See FIG. 3 | See FIG. 4 | 6.5 | 0.22 |
| E.2 | Provided | See FIG. 3 | See FIG. 5 | 6.5 | 0.22 |
| E.3 | Provided | See FIG. 3 | See FIG. 6 | 6.5 | 0.22 |
| E.4 | Provided | See FIG. 3 | See FIG. 7 | 6.5 | 0.22 |
| E.5 | Provided | See FIG. 3 | See FIG. 8 | 6.5 | 0.22 |
| E.6 | Provided | See FIG. 3 | See FIG. 5 | 6.5 | 0.11 |
| E.7 | Provided | See FIG. 3 | See FIG. 5 | 6.5 | 0.22 |
| E.8 | Provided | See FIG. 3 | See FIG. 5 | 6.5 | 0.22 |
| E.9 | Provided | See FIG. 3 | See FIG. 5 | 6.5 | 0.22 |
| E.10 | Provided | See FIG. 3 | See FIG. 4 | 6.5 | 0.31 |
| E.11 | Provided | See FIG. 3 | See FIG. 13 | 6.5 | 0.31 |
| CE.1 | No | — | — | 6.5 | — |
| *Negative Electrode Layer* | | | | |
| E.1 | Provided | See FIG. 3 | See FIG. 4 | 3.4 | 0.20 |
| E.2 | No | — | — | 3.4 | — |
| E.3 | No | — | — | 3.4 | — |
| E.4 | No | — | — | 3.4 | — |
| E.5 | No | — | — | 3.4 | — |
| E.6 | No | — | — | 3.4 | — |
| E.7 | No | — | — | 3.4 | — |
| E.8 | No | — | — | 3.4 | — |
| E.9 | No | — | — | 3.4 | — |
| E.10 | Provided | See FIG. 3 | See FIG. 4 | 3.4 | 0.29 |
| E.11 | Provided | See FIG. 3 | See FIG. 13 | 3.4 | 0.29 |
| CE.1 | No | — | — | 3.4 | — |

| | Size (d1) (μm) | Size (d2) (μm) | Size (d3) (mm) | thickness (T) (μm) | A/C (—) |
|---|---|---|---|---|---|
| *Positive Electrode Layer* | | | | | |
| E.1 | 80 | 370 | 30 | 370 | 1.2 |
| E.2 | 80 | 370 | 30 | 370 | 1.2 |
| E.3 | 80 | 150 | 30 | 370 | 1.2 |
| E.4 | 80 | 100 | 30 | 370 | 1.2 |
| E.5 | 80 | 150 | 30 | 370 | 1.2 |
| E.6 | 40 | 370 | 30 | 370 | 1.2 |
| E.7 | 80 | 370 | 15 | 370 | 1.2 |
| E.8 | 80 | 370 | 30 | 370 | 1.1 |
| E.9 | 80 | 370 | 30 | 370 | 1.3 |
| E.10 | 200 | 650 | 30 | 650 | 1.2 |
| E.11 | 200 | 650 | 30 | 650 | 1.2 |
| CE.1 | — | — | — | 370 | 1.2 |
| *Negative Electrode Layer* | | | | | |
| E.1 | 80 | 400 | 30 | 400 | |
| E.2 | — | — | — | 700 | |
| E.3 | — | — | — | 400 | |
| E.4 | — | — | — | 400 | |
| E.5 | — | — | — | 400 | |
| E.6 | — | — | — | 400 | |
| E.7 | — | — | — | 400 | |
| E.8 | — | — | — | 400 | |
| E.9 | — | — | — | 400 | |
| E.10 | 200 | 700 | 30 | 700 | |
| E.11 | 200 | 700 | 30 | 700 | |
| CE.1 | — | — | — | 400 | |

E. = Example;
CE. = Comparative Example

Performance Evaluation

For the lithium ion secondary cell of each of the examples described above, the charging capacity and the discharge capacity at 25° C. were measured, and the charge/discharge efficiency was calculated. Specifically, measurements were made as follows. The electrode part of the lithium ion secondary cell of each of the examples described above was sandwiched between one piece each of silicon rubber from above and below, and furthermore was sandwiched between cell restraint jigs (made from aluminum plate, thickness of 7 mm) from above and below, and pressure was applied to the electrode part by tightening these two cell restraint jigs together with screws. Desired pressure was obtained by adjusting the torque for tightening the screws. In this state, the lithium ion secondary cell was charged to 4.20 V in an atmosphere at 25° C. according to a constant current method corresponding to a current density of 0.05 C, and then was further charged at that voltage according to a constant voltage method. Charging was terminated at the time point that the charging period exceeded 30 hours, or at the time point that the charging current fell below 0.005 C equivalent. After suspending the cell for 1 hour, it was discharged down to 2.50 V according to a constant current method at a current density corresponding to 0.05 C. Here, the ratio of the charging capacity (in Ah) from the start of the first charging after the prototype cell was manufactured to the end thereof and the discharge capacity (in Ah) from the start of subsequent discharge to the end thereof was calculated as the charge/discharge efficiency. The results obtained are shown in Table 2.

TABLE 2

Table 2

| | Charging capacity (mAh/g) | Discharge capacity (mAh/g) | Charge/discharge efficiency (%) |
|---|---|---|---|
| E.1 | 210.7 | 156.2 | 74.2 |
| E.2 | 210.5 | 154.7 | 73.5 |
| E.3 | 211.1 | 154.1 | 73 |
| E.4 | 210.3 | 151.8 | 72.2 |
| E.5 | 210.7 | 153.6 | 72.9 |
| E.6 | 210 | 153.3 | 73 |
| E.7 | 210.3 | 155.6 | 74 |
| E.8 | 209.2 | 154.2 | 73.7 |
| E.9 | 212 | 152.9 | 72.1 |
| E.10 | 206.5 | 149.1 | 72.2 |
| E.11 | 208.2 | 152.6 | 73.3 |
| CE.1 | 202.5 | 144.2 | 71.2 |

E. = Example;
CE. = Comparative Example

According to Table 1 and Table 2, it will be understood that Example 1 to Example 11, which fall within the scope of the present invention, have excellent charge/discharge capacity and charge/discharge efficiency as compared with Comparative Example 1 which does not fall within the scope of the present invention. It is considered that this is because the electrode layer is provided on the surface of the current collector, and the electrode layer comprises the electrode layer forming material containing electrode active material and ion conductive liquid, has a predetermined gas flow passage, and is non-bonded body. Moreover, it is also considered that this is because the viscosity of the electrode forming material is set to 2.8 Pa·s or more and 7.7 Pa·s or less.

Furthermore, according to Table 1 and Table 2, it will be understood that, while the charge/discharge efficiency is slightly decreased in Example 2 which has the predetermined gas flow passages only in the positive electrode, as contrasted with Example 1 which has the predetermined gas flow passages both in the positive electrode and in the negative electrode, still this Example 2 has a charge/discharge capacity and a charge/discharge efficiency that still excel as compared to Comparative Example 1 which does not fall within the scope of the present invention. Due to this, it is considered that sufficient technical effect is still obtained even when only one of the positive electrode and the negative electrode has the predetermined gas flow passages.

Yet further, according to Table 1 and Table 2, it will be understood, when the size (d1) of the positive electrode layer/the thickness (T) of the positive electrode layer of Example 2 and the size (d1)/the thickness (T) of Example 6 are compared, that Example 2 has more excellent charge/discharge capacity and charge/discharge efficiency, since the gas flow passage of Example 2 is wider.

Even further, according to Table 1 and Table 2, it is considered that Example 1 to Example 11, which fall within the scope of the present invention, have more excellent charge/discharge capacity and charge/discharge efficiency as compared with Comparative Example 1 which does not fall within the scope of the present invention, since the gas flow passage communicates up to the outer peripheral edges of the positive electrode layer and the negative electrode layer.

Still further, according to Table 1 and Table 2, when the size (d1) and the size (d2) of the positive electrode layer of Example 2 are compared with the size (d1) and the size (d2) of the positive electrode layers of Examples 3 to 5, it will be understood that Example 2 has more excellent charge/discharge capacity and charge/discharge efficiency, since in Example 2 the gas discharge performance is enhanced due to the provision of a larger number of the gas flow passage.

Moreover, according to Table 1 and Table 2, when the size (d3) of the positive electrode layer of Example 7 is compared with the size (d3) of the positive electrode layer of Example 2, it will be understood that Example 7 has more excellent charge/discharge capacity and charge/discharge efficiency, since in Example 7 the gas discharge performance is enhanced by making the intervals of the gas flow passages narrower.

Furthermore, according to Table 1 and Table 2, when (A/C) of the secondary cell of Example 8 is compared with (A/C) of the secondary cell of Example 9, it will be understood that Example 8 has more excellent charge/discharge capacity and charge/discharge efficiency, since in Example 8 the non-reversible capacity is reduced by making A/C lower.

Also, according to Table 1 and Table 2, when Example 11 which falls within the scope of the present invention is compared with Example 10, it is considered that Example 11 has more excellent charge/discharge capacity and charge/discharge efficiency, since the arrangement of the gas flow passage of the positive electrode layer in the in-plane direction of the positive electrode layer and the arrangement of the gas flow passage of the negative electrode layer in the in-plane direction of the negative electrode layer are corresponding to each other.

Although the present invention has been explained with reference to an embodiment and Examples, the present invention should not be considered as being limited by these; and various modifications can be made while still remaining within the scope of the gist of the present invention.

For example, in the embodiment described above, a bipolar type lithium ion secondary cell has been explained as an example. However, the type of cell to which the present invention can be applied is not particularly limited, and the present invention could be applied to any type of a conventionally known non-aqueous electrolyte secondary cell, such as a so-called parallel laminated type lithium ion secondary cell in which, in a power generation element, single cell layers are connected in parallel, or the like, and to any type of a conventionally known aqueous electrolyte secondary cell.

REFERENCE SIGNS LIST

10: lithium ion secondary cell
11: current collector
11a, 11b: outermost layer current collector
13: positive electrode layer
13a: outer peripheral edge
131: gas flow passage
15: negative electrode layer
151: gas flow passage
17: electrolyte layer
19: single cell layer
21: cell element
23: bipolar type electrode
25: positive current collection plate
27: negative current collection plate
29: sealing portion
31: outer casing

The invention claimed is:

1. An electrode for a secondary cell, comprising:
   a current collector; and
   an electrode layer disposed upon a surface of the current collector, in which the electrode layer has a gas flow passage that is one or both of disposed on a surface and in an interior of the electrode layer, the gas flow passage extending in an in-plane direction of the electrode layer, wherein
   the electrode layer is made from an electrode layer forming material that contains an electrode active material and an ion conductive liquid,
   the electrode layer is a non-bonded body, and
   a ratio of a size of the gas passage in the in-plane direction of the electrode layer to a thickness of the electrode layer is 0.32 or less,
   wherein the electrode layer forming material contains particles, each particle coated in a resin and dried to form a powder, and wherein an amount of the resin included in the electrode layer forming material is 1% by mass or less.

2. The electrode for a secondary cell according to claim 1, wherein a viscosity of the electrode layer forming material is 2.8 P·as or more and 7.7 P·as or less.

3. The electrode for a secondary cell according to claim 1, wherein the gas flow passage has a groove shape or a tubular shape.

4. The electrode for a secondary cell according to claim 1, wherein the gas flow passage communicates up to an outer peripheral edge of the electrode layer.

5. The electrode for a secondary cell according to claim 1, wherein a size of the gas flow passage in a thickness direction of the electrode layer and/or a size of the gas passage in an in-plane direction of the electrode layer are 2 μm or more.

6. The electrode for a secondary cell according to claim 1, wherein the electrode layer has the gas flow passage comprises gas flow passages; and
   an interval between the gas flow passages next to each other is 30 mm or less.

7. The electrode for a secondary cell according to claim 1, which is a bipolar type electrode.

8. A secondary cell, comprising:

a power generation element having an electrolyte layer, a positive electrode for a secondary cell disposed on a first surface side of the electrolyte layer, and a negative electrode for a secondary cell disposed on a second surface side on a back of the first surface side of the electrolyte layer; and an outer casing that houses the power generation element, wherein at least one of the positive electrode for a secondary cell and the negative electrode for a secondary cell comprises:

a current collector and an electrode layer disposed upon a surface of the current collector, in which the electrode layer has a gas flow passage that is one or both of disposed on a surface and in an interior of the electrode layer, the gas flow passage extending in an in-plane direction of the electrode layer, wherein the electrode layer is made from an electrode layer forming material that contains an electrode active material and an ion conductive liquid, the electrode layer is a non-bonded body, and a ratio of a size of the gas passage in the in-plane direction of the electrode layer to a thickness of the electrode layer is 0.32 or less, wherein the electrode layer forming material contains particles, each particle coated in a resin and dried to form a powder, and wherein an amount of the resin included in the electrode layer forming material is 1% by mass or less.

9. The secondary cell according to claim 8, wherein a surface pressure applied to a thickness direction of the electrode layer of the electrode for a secondary cell is 68.6 kPa or more.

10. The secondary cell according to claim 8, wherein the positive electrode for a secondary cell is the electrode for a secondary cell;

a thickness of the positive electrode layer of the positive electrode for a secondary cell is 140 µm or more; and a ratio of a charging capacity of the negative electrode layer of the negative electrode for a secondary cell to a charging capacity of the positive electrode layer is 1.05 or more.

11. The secondary cell according to claim 8, wherein the positive electrode for a secondary cell and the negative electrode for a secondary cell are the electrode for a secondary cell; and an arrangement of the gas flow passage in an in-plane direction of the positive electrode layer of the positive electrode for a secondary cell and an arrangement of the gas flow passage in an in-plane direction of the negative electrode layer of the negative electrode for a secondary cell are superimposed.

12. The electrode for a secondary cell according to claim 1, wherein the ratio of the size of the gas passage in the in-plane direction of the electrode layer to the thickness of the electrode layer is 0.03 or more.

13. The electrode for a secondary cell according to claim 1, wherein the ratio of the size of the gas passage in the in-plane direction of the electrode layer to the thickness of the electrode layer is 0.11 or more.

* * * * *